(12) United States Patent
Kaburagi et al.

(10) Patent No.: US 6,668,100 B1
(45) Date of Patent: Dec. 23, 2003

(54) IMAGE PROCESSING METHOD AND DEVICE

(75) Inventors: Hiroshi Kaburagi, Yokohama (JP); Shigeo Yamagata, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/210,549

(22) Filed: Dec. 14, 1998

(30) Foreign Application Priority Data

Dec. 24, 1997 (JP) .............................................. 9-355760

(51) Int. Cl.[7] .................................................. G06K 9/46
(52) U.S. Cl. ........................ 382/299; 382/252; 382/267; 382/274; 382/275; 358/1.2; 358/1.9; 358/3.03
(58) Field of Search .................................. 382/299, 267, 382/293, 295, 298; 347/131, 254; 358/456, 459, 530, 1.8, 1.2, 1.9, 3.03, 534; 345/660, 698, 699

(56) References Cited

U.S. PATENT DOCUMENTS

| | | | | |
|---|---|---|---|---|
| 4,959,659 A | * | 9/1990 | Sasaki et al. ................. | 346/1.1 |
| 5,121,446 A | | 6/1992 | Yamada et al. ................ | 382/50 |
| 5,204,753 A | * | 4/1993 | Tai ............................... | 358/298 |
| 5,418,618 A | * | 5/1995 | Kagawa et al. .............. | 358/298 |
| 5,577,136 A | | 11/1996 | Tanioka et al. ............... | 382/270 |
| 5,777,759 A | | 7/1998 | Kaburagi et al. ............ | 358/536 |
| 5,825,940 A | | 10/1998 | Yamagata et al. ........... | 382/276 |
| 5,990,924 A | * | 11/1999 | Kido et al. .................. | 347/254 |
| 6,011,878 A | * | 1/2000 | Ushida et al. .............. | 382/298 |
| 6,031,627 A | * | 2/2000 | Kakutani ..................... | 358/1.9 |
| 6,108,105 A | * | 8/2000 | Takeuchi et al. ............ | 358/455 |

* cited by examiner

*Primary Examiner*—Bhavesh M. Mehta
*Assistant Examiner*—Yosef Kassa
(74) *Attorney, Agent, or Firm*—Fitzpatrick, Cella, Harper & Scinto

(57) ABSTRACT

An image processing device and method for convert multi-value image data having light and dark information per pixel into binary data for pseudo half-tone representation. A binarization results delay unit holds binarized data near the pixel of interest obtained by a binarizing unit, a slice value control unit calculates the amount of change in the slice value based on the concentration of the image or the binarized data pattern thereof, and determines the binarized slice value S based on the amount of change in slice value. The binarizing unit binarizing input image signals using the binarized slice value S. Thus, control of the amount of dot concentration in an arbitrary concentration area, and accurate control of texture can be realized.

38 Claims, 27 Drawing Sheets

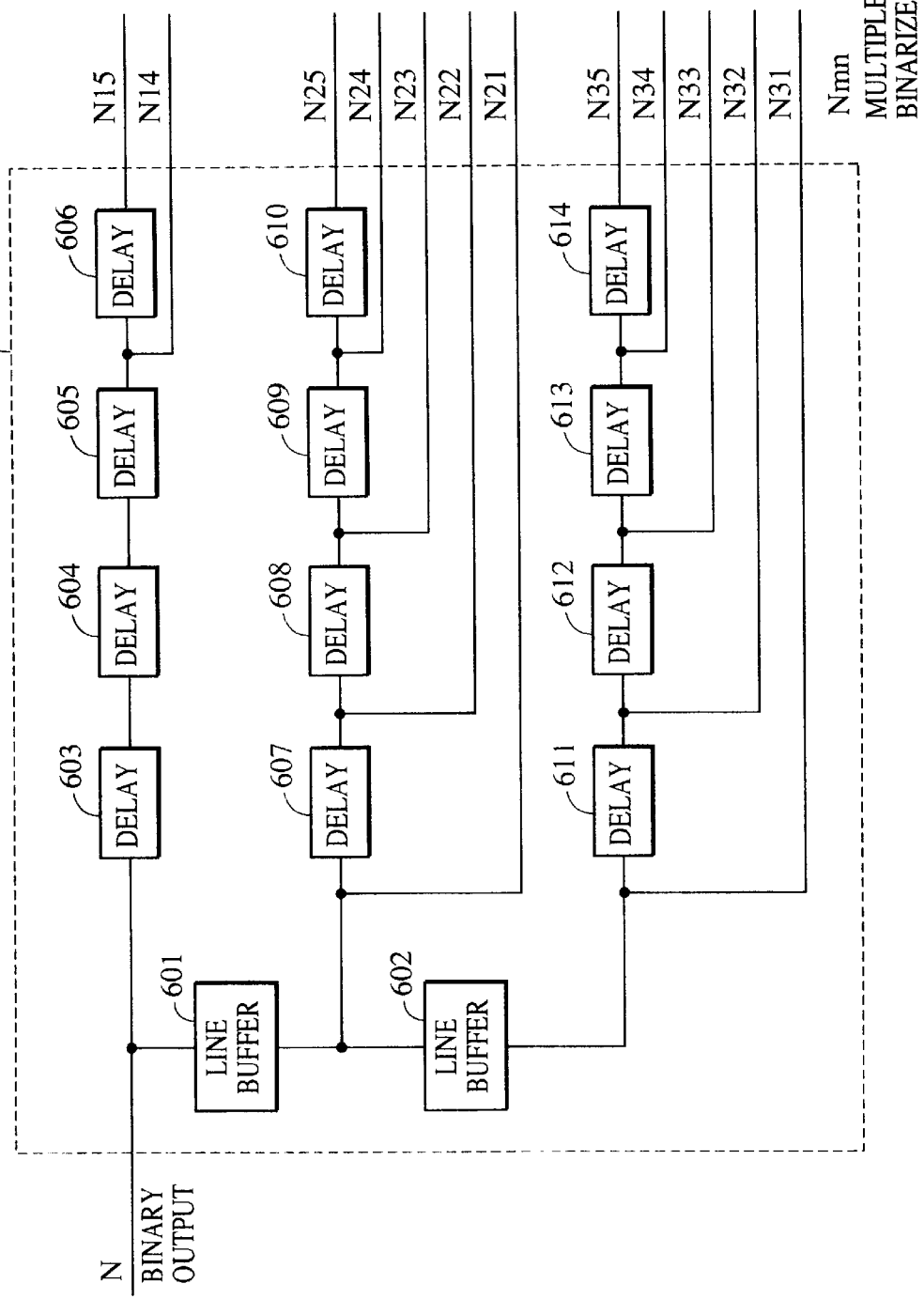

FIG. 10

| M35 | M34 | M33 | M32 | M31 |
|-----|-----|-----|-----|-----|
| M25 | M24 | M23 | M22 | M21 |
| M15 | M14 |     |     |     |

← PIXEL OF INTEREST

```
if(m<LR1){
    II=0;                                    ---- 1001
}
else if(LR1≦m && m<LR2){
    II=ALF×(m-LR1)/(LR2-LR1);                ---- 1002
}
else if(LR2≦m && m<LR3){
    II=ALF;                                  ---- 1003
}
else if(LR3≦m && m<LR4){
    II=ALF×(LR4-m)/(LR4-LR3);                ---- 1004
}
else{
    II=0;                                    ---- 1005
}
```

305

INITIALIZING
    for(ii=25; ii>=0; --ii){p[ii]=0;}
    p[12]=1;

GENERATING RANDOM NUMBERS
    p[0]=((p[25]^ p[24]^ p[23]^ p[22]) & 1);
    for(k=24; k>=0; --k){
        p[k+1]=p[k];
    {
RANDOM NUMBER=(1-2*p[2]*(p[17]*16+p[18]*8+p[19]*4+p[20]*2+p[21]));

GENERATED RANDOM NUMBER
$-31 \leq SH1 \leq 31$

FIG. 17

```
if(DR<LR1){
    II=0;                                          ---------- 1301
}
else if(LR1≦DR && DR<LR2){
    II=ALF×(DR-LR1)/(LR2-LR1);   ---------- 1302
}
else if(LR2≦DR && DR<LR3){
    II=ALF;                                       ---------- 1303
}
else if(LR3≦DR && DR<LR4){
    II=ALF×(LR4-DR)/(LR4-LR3);   ---------- 1304
}
else{
    II=0;                                          ---------- 1305
}
```

1103

※
LR1 : CONSTANT
LR2 : CONSTANT
LR3 : CONSTANT
LR4 : CONSTANT
ALF : CONSTANT

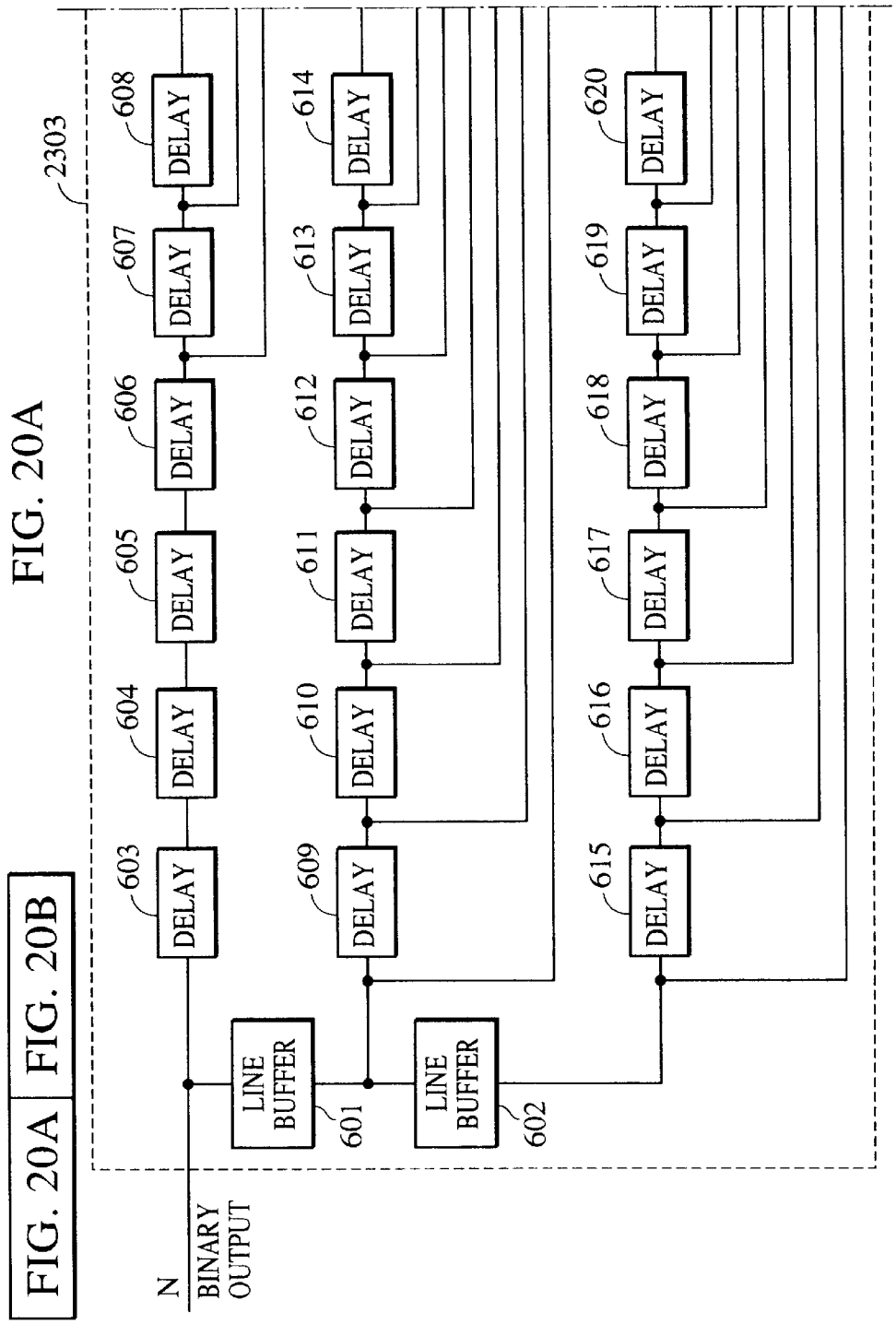

```
INITIALIZING
    for(ii=25; ii>=0; --ii){p[ii]=0;}
    p[12]=1;

GENERATING RANDOM NUMBERS
    p[0]=((p[25]^p[24]^p[23]^p[22]) & 1);
    for(k=24; k>=0; --k){
        p[k+1]=p[k];
    }
    RANDOM NUMBER=(1-2*p[22])*((p[15]*64+p[16]*32+p[17]*16
                   +p[18]*8+p[19]*4+p[20]*2+p[21]*17)/128);
```

GENERATED RANDOM NUMBER
$-17 \leq SH1 \leq 17$

FIG. 22

```
                                                    ┌308
if(DR<=LR1){
    II=0;
}
else if(LR1<DR && DR<=LR2){
    II=((DR-LR1)*(ALF*256/(LR2-LR1)))/256;
}
else if(LR2<DR && DR<=LR3){
    II=ALF;
}
else if(LR3<DR && DR<=LR4){
    II=ALF-((DR-LR3)*(ALF*256/(LR4-LR3)))/256;
}
else{
    II=0;
}
T=II-ALFm
```

if(B32==0 && B22==1 && B12==0 && B21==0 && B11==1 && B01==0){
    S=255;
}
else if(Bi12==0 && Bi22==1 && Bi32==0 && B01==0 && Bi11==1 && Bi21==0){
    S=255;
}
else if(B12==0 && B02==0 && Bi12==0 && Bi22==0 && Bi32==0
    && B11==0 && B01==0 && Bi11==1 && Bi21==0 && Bi31==0 && B20==0 && B10==0){
    if(D<31){S==255;}
    else{ S=m; }
}
else if(B32==0 && B22==0 && B12==0 && B02==0 && Bi12==0
    && B31==0 && B21==0 && B11==1 && B01==0 && Bi11==0 && B20==0 && B10==0){
    if(D<31){S==255;}
    else{ S=m; }
}
else if(B02==0 && Bi12==0 && B11==0 && B01==1 && Bi11==1 && Bi21==0 && B20==0 && B10==0){
    S=m-A;
}
else if((B02==0 II Bi12==0) && B11==0 && B01==1 && Bi11==1 && Bi21==0){
    S=m-B;
}
else if(B12==0 && B02==0 && B21==0 && B11==1 && B01==1 && Bi11==0 && B20==0 && B10==0){
    S=m-A;
}
else if((B12==0 II B02==0) && B21==0 && B11==1 && B01==1 && Bi11==0){
    S=m-B;
}
else if(B12==0 && B02==0 && B21==0 && Bi11==0 && Bi21==0 && B20==0 && B10==0){
    S=m-A;
}
else if(B12==0 && B02==1 && Bi12==0 && B21==0 && B11==1 && B01==0){
    S=m-B;
}
else{
    S=m;
}
```

※ LT1 : CONSTANT(2)
LT2 : CONSTANT(4)
LT3 : CONSTANT(8)
LT4 : CONSTANT(16)

FIG. 24

| B32 | B22 | B12 | B02 | Bi12 | Bi22 | Bi32 |
|-----|-----|-----|-----|------|------|------|
| B31 | B21 | B11 | B01 | Bi11 | Bi21 | Bi31 |
| B30 | B20 | B10 |     |      |      |      |

PIXEL OF INTEREST

if(B32==0 && B22==1 && B12==0 && B21==0 && B11==1 && B01==0){
    S'=255;
}
else if(Bi12==0 && Bi22==1 && Bi32==0 && B01==0 && Bi11==1 && Bi21==0){
    S'=255;
}
else if(B12==0 && B02==0 && Bi12==0 && Bi22==0 && Bi32==0
    && B11==0 && B01==0 && Bi11==1 && Bi21==0 && Bi31==0 && B20==0){
    if(D<31){S'==255;}
    else{ S'=0; }
}
else if(B32==0 && B22==0 && B12==0 && B02==0 && Bi12==0
    && B31==0 && B21==0 && B11==1 && B01==0 && Bi11==0 && B20==0){
    if(D<31){S'==255;}
    else{ S'=0; }
}
else if(B02==0 && Bi12==0 && B11==0 && B01==1 && Bi11==1 && Bi21==0 && B20==0){
    S'= -A;
}
else if((B02==0 II Bi12==0) && B11==0 && B01==1 && Bi11==1 && Bi21==0){
    S'= -B;
}
else if(B12==0 && B02==0 && B21==0 && B11==1 && B01==1 && Bi11==0 && B20==0){
    S'= -A;
}
else if((B12==0 II B02==0) && B21==0 && B11==1 && B01==1 && Bi11==0){
    S'= -B;
}
else if(B12==0 && B02==0 && B21==0 && Bi11==0 && Bi21==0 && B20==0){
    S'= -A;
}
else if(B12==0 && B02==1 && Bi12==0 && B21==0 && B11==1 && B01==0){
    S'= -B;
}
else{
    S'= 0;
}
```

FIG. 27

| B32 | B22 | B12 | B02 | Bi12 | Bi22 | Bi32 |
|-----|-----|-----|-----|------|------|------|
| B31 | B21 | B11 | B01 | Bi11 | Bi21 | Bi31 |
| B30 | B20 | B10 |     |      |      |      |

← PIXEL OF INTEREST

FIG. 28

```
                                                    2310
if(S'==255){ S=S' ;    }
else{    S=S' + m;   }
```

IMAGE PROCESSING METHOD AND DEVICE

BACKGROUND OF THE INVENTION

1. Field of the Invention

The present invention relates to an image processing method and device, and more particularly to an image processing method and device for converting multiple-value image data into n-value data (where n is an integer equal to or greater than 2).

2. Description of the Related Art

Known image processing methods for performing gradient representation include the error diffusion method (hereafter referred to as the ED method), the mean density method (hereafter referred to as the MD method) such as disclosed in U.S. Pat. No. 5,121,446 and U.S. Pat. No. 5,577,136, and so forth. These methods attempt macro-representation of gradients by representing area gradients using a few gradients. In other words, these are pseudo gradient representation methods. These methods are advantageous in that the load on the hardware handling the image data can be reduced, owing to the fact that an image can be formed using few gradients.

However, there have been problems in that some printers are not able to accurately output solitary dots from the n-value process, depending on the properties of the printer. Attempting pseudo gradient representation methods with a printer not able to accurately output such solitary dots has resulted in trouble such as irregular concentration at certain concentration ranges or formation of pseudo outlines.

Accordingly, it has been proposed to deal with the problem in such printer properties by concentrating the dots to a certain degree. However, this is a problem, since simply applying high dot concentration to the entire concentration area decreases the overall output resolution of the image.

Another problem is that creating the hardware for concentrating dots for one set of printer properties necessitates reconfiguring or remaking the hardware each time the printer properties change.

There has also been a problem wherein compressing error diffused images using a facsimile or the like yields a small compression rate, since the rate of contact between the white dots and black dots is small.

SUMMARY OF THE INVENTION

The present invention has been made in light of the above-described problems in the known art, and accordingly, it is an object of the present invention to provide an image processing method and device capable of controlling the amount of dot concentration at any concentration area.

It is another object of the present invention to provide an image processing method and device capable of controlling dot concentration based on the state of n-value-izing of multi-value image data, preventing deterioration of output resolution which occurs with dot concentration.

It is yet another object of the present invention to enable control of the amount of dot concentration according to printer properties.

It is still another object of the present invention to provide an image processing method and device capable of controlling the amount of dot concentration in certain concentration ranges at which pseudo outlines or irregularities in concentration, for example, tend to occur.

It is a further object of the present invention to enable accurate control of texture by controlling the threshold value of the n-value-izing process according to the array pattern resulting from previous n-value-izing cases. Now, the term "accurate control of texture" refers to controlling to a desired dot position when recording.

In order to achieve the above objects, an image processing device according one aspect of the present invention includes:

means for inputting multi-value image data, and means for converting the multi-value image data input by the input means into n-value data.

The device also includes means for controlling the amount of concentration of dots represented by the n-value data obtained by the converting means, and means for judging the concentration of the input image.

The control means controls the amount of concentration of dots according to the concentration of the image judged by the judging means.

Also, in order to achieve the above objects, an image processing device according to another aspect the present invention includes means for inputting multi-value image data, means for converting the multi-value image data input by the input means into n-value data, and means for controlling the amount of concentration of dots represented by the n-value data obtained by the converting means.

The device also includes means for storing the n-value data of a plurality of pixels obtained by the converting means.

The control means controls the amount of concentration of dots based on the n-value data of the plurality of pixels, stored in the storing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a block diagram illustrating the configuration of the binarized results delay unit 303;

FIG. 10 is a diagram illustrating an example of coefficients for the mean density calculating unit 304;

FIG. 12 is a diagram describing the operation of the configuration shown in FIG. 11;

FIG. 17 is a diagram illustrating the operation of the slice value control unit 1103 according to the second embodiment;

FIGS. 20A and 20B are block diagrams illustrating the configuration of the binarized results delay unit 2303 according to the third embodiment;

FIG. 22 is a diagram illustrating the operation of the hysteresis control amount calculating unit 2308 according to the third embodiment;

FIG. 23 is a diagram describing the operation of the threshold value calculating unit 2305 according to the third embodiment;

FIG. 24 is a diagram describing the binarized results output B*ij according to the third embodiment;

FIG. 26 is a diagram describing the operation of the threshold value calculating unit according to the fourth embodiment;

FIG. 27 is a diagram illustrating the binarized results array state (pattern) used in the threshold value calculating unit 2309 according to the fourth embodiment; and FIG. 28 is a diagram illustrating the adding process by the adding unit 2310 according to the fourth embodiment.

DETAILED DESCRIPTION OF THE PREFERRED EMBODIMENTS

Preferred embodiments of the present invention will now be described in detail according with the accompanying drawings.

First Embodiment
<Overview of Processing>

Figure 1:
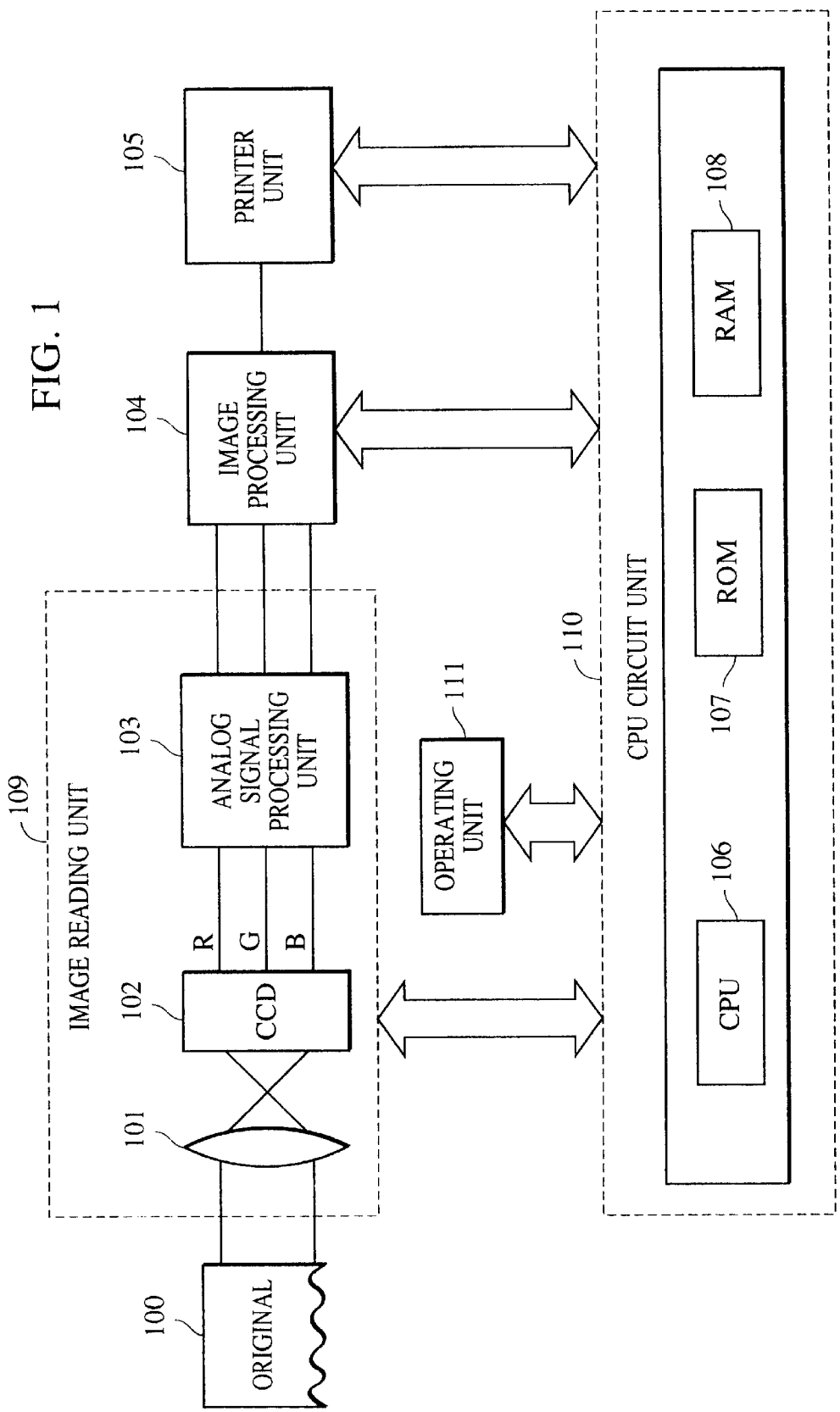
FIG. 1 is a block diagram schematically illustrating the overall processing configuration of a photocopier according to a first embodiment.

FIG. 1 is a block diagram schematically illustrating the overall processing configuration of a photocopier according to a first embodiment. The image reading unit 109 is comprised of a lens 101, a CCD sensor 102, an analog signal processing unit 103, and so forth. An original image 100 is imaged on the CCD sensor 102 via the lens 101 and converted into analog electrical signals representing of R (Red), G (Green), and B (Blue), by means of the CCD sensor 102. The image information converted into electrical signals is input to the analog signal processing unit 103, sampling & holding, dark level correction, etc., is performed for each of the colors R, G, and B. The signals are then subjected to analog/digital conversion (A/D conversion). The full-color signals thus digitized are input to an image processing unit 104.

The processing unit 104 performs correction processing necessary for the reading system such as sharing correction, color correction, g correction and so on, as well as other processing and modifying such as smoothing and edge highlighting. The signals are then output to printer unit 105.

The printer unit 105 is comprised of an exposure control unit (not shown) of laser or so forth, an image forming unit (not shown), a paper transpiration unit (not shown) for transporting transfer paper, and so forth, and records the image of the transfer paper according to the input image signals.

The CPU circuit unit 110 is made up of a CPU 106, ROM 107, RAM 108, and so forth, and controls the image reading unit 109, the image processing unit 104, the printer unit 105, etc., thereby centrally controlling the sequences of the main unit. Incidentally, reference numeral 111 denotes an operating unit for the user to perform various settings.

<Image Processing Unit>

Figure 2:
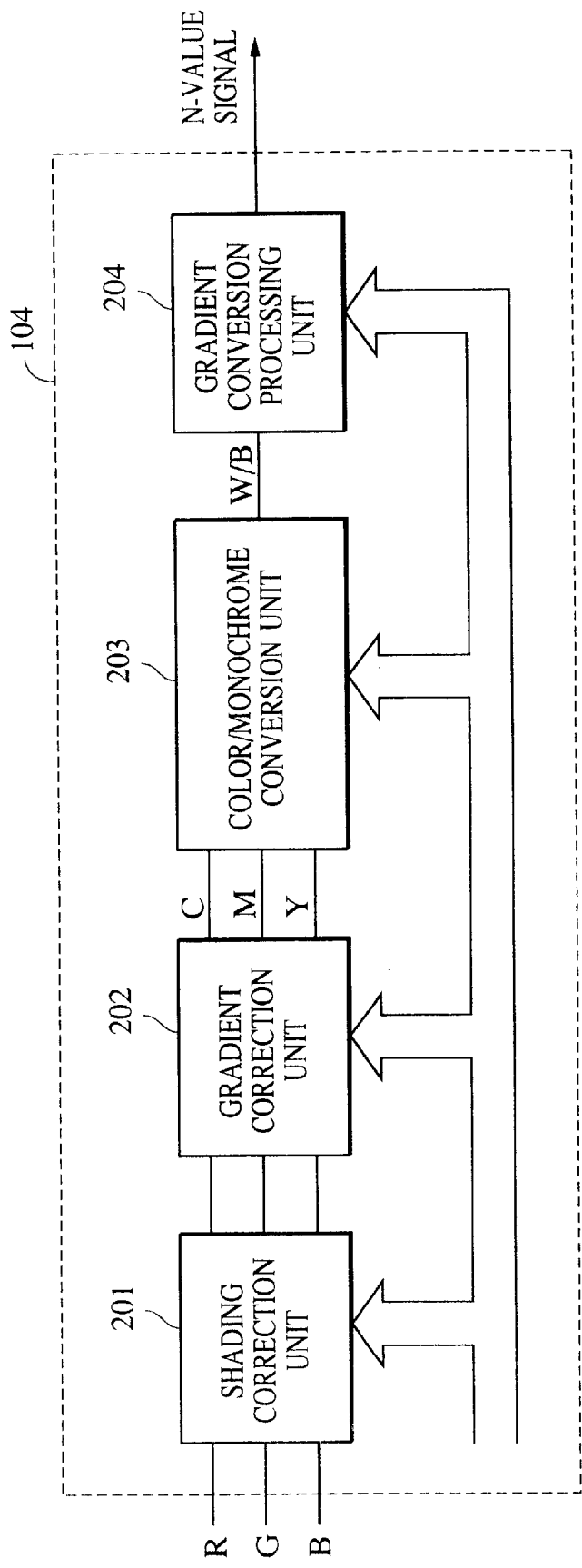
FIG. 2 is a block diagram illustrating the configuration of the image processing unit 104.

Next, description shall be made regarding the image processing unit 104. FIG. 2 is a block diagram illustrating the configuration of the image processing unit 104.

The digital image signals output from the analog signal processing unit 103 are input to a shading correction unit 201. The shading correction unit 201 corrects irregularities in the properties of the CCD sensor 102 for reading the original, and light distribution properties of the lamp for illuminating the original. The image signal which has been subjected to correction calculation is input into a gradient correction unit 202 in order to convert luminance information signals into concentration data, thereby creating concentration image data. The image signals converted into concentration image data are input to the color/monochrome converting unit 203, and output as monochrome data. The monochrome data output from the color/monochrome converting unit 203 is input to the gradient conversion processing unit 204, and is subjected to either error diffusion processing (ED processing) or mean density processing (MD processing) for pseudo half-tone processing.

Next, the gradient conversion processing unit 204 which is one of the constructions characteristic of the present embodiment shall be described with reference to FIG. 3.

<Gradient Conversion Processing Unit>

Figure 3:
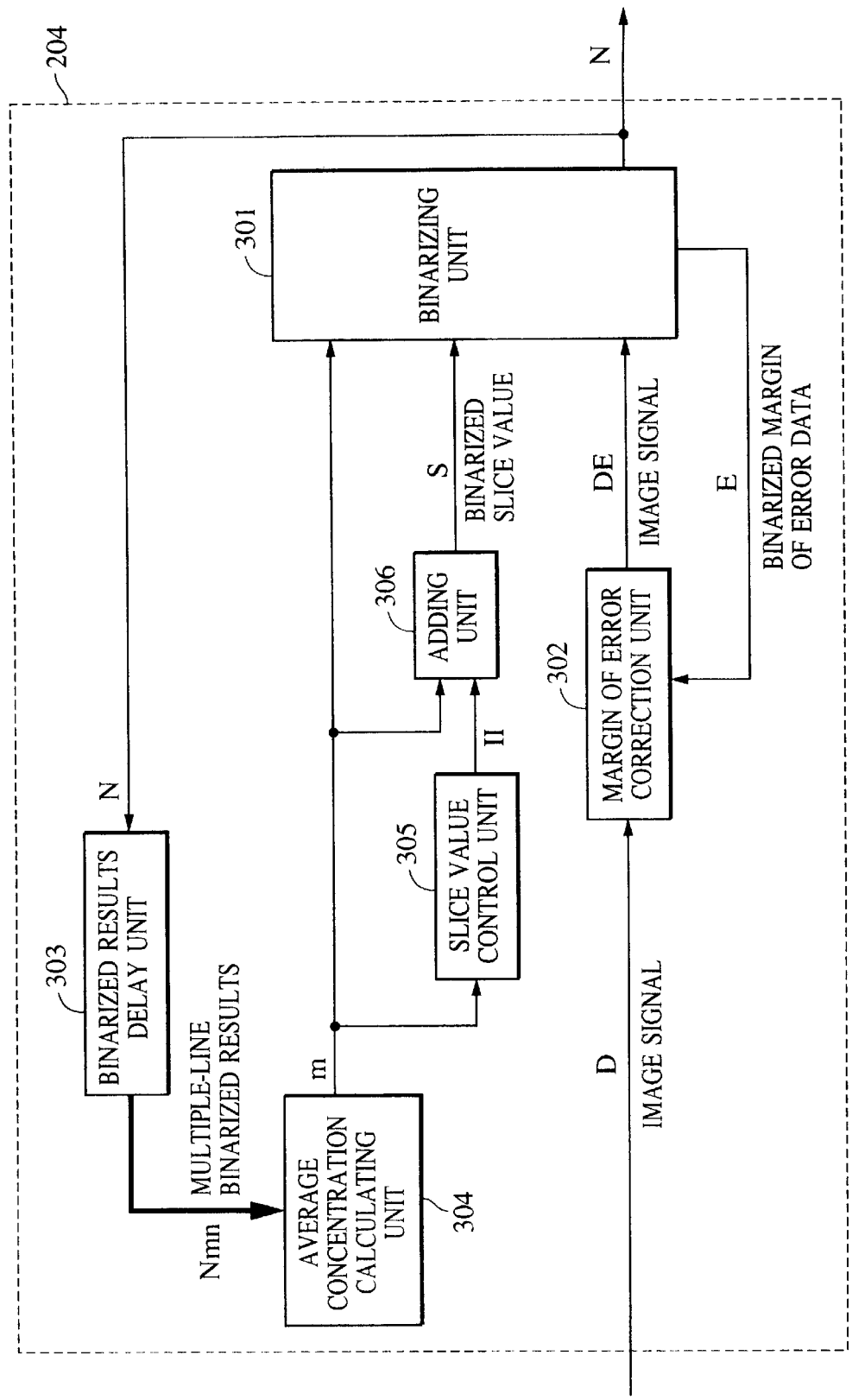
FIG. 3 is a block diagram illustrating the detailed configuration of the gradient conversion processing unit 204.

FIG. 3 is a block diagram illustrating the detailed configuration of the gradient conversion processing unit. With this first embodiment, description will be made regarding an example wherein multi-value image data is binarized, and the MD method has been employed for the pseudo half-tone processing method.

In FIG. 3, a margin of error correction unit 302 inputs image signals D from the color/monochrome converting unit 203 and the binarized margin error data E generated in the later-described binarizing processing unit 301, performs later-described margin of error correction and calculates the image signal DE. The image signal DE is output to the binarizing unit 301.

The binarizing unit 301 inputs the image signal DE from the error correction unit 302, binarized slice value S from the later-described adding unit 306, and the mean density calculated value m from the mean density calculating unit 304, calculates a binary output N by means of comparing the image signal DE with the binarized slice value S, and calculates the binarized margin of error data E by means of subtracting the image signal DE and the mean density calculated value m. Though details will be given later, the amount of concentration of dots is appropriately controlled by means of changing the "binarized slice value S" input to the binarizing unit 301 according to the mean density calculated value m, thereby improving the image quality.

A binarized results delay unit 303 inputs the binary output N, performs delay of a certain number of lines, and sends to the mean density calculating unit 304 multiple binarized results Nmn spanning a plurality of lines. The mean density calculating unit 304 inputs the multiple binarized results Nmn, and yields the sum of products (described later), thereby obtaining the mean density calculation value m. The obtained mean density calculation value m is input to the slice value control unit 305, adding unit 306, and binarizing unit 301.

The slice value control unit 305 inputs the mean density calculation value m, calculates the threshold value control amount II for each concentration area according to the mean density calculation value m by means of later-described processing, and sends this to the adding unit 306. The adding unit 306 inputs the output m of the mean density calculating unit 304 and the output II of the slice value control unit 305, performs adding under a limiter which is described later, and outputs data S to the binarizing unit 301. The details of each process are described below in detail.

Figure 4:
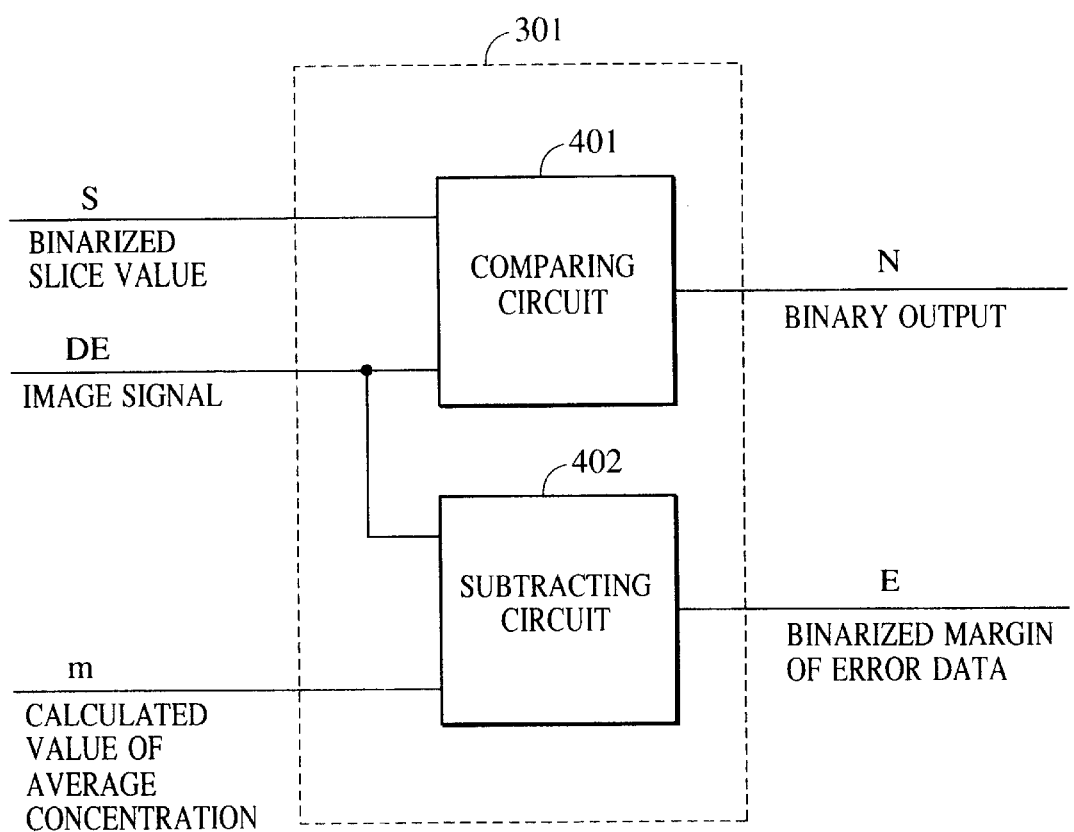
FIG. 4 is a block diagram illustrating the configuration of the binarizing unit 301.

FIG. 4 is a block diagram illustrating the configuration of the binarizing unit 301. The binarizing unit 301 inputs the image signals DE, the binarized slice value S, and the mean density calculation value m, and by means of comparing these, outputs binary output N and binarized error data E.

The input image signal DE is separated into two systems, one being input to a comparing circuit 401, and the other being input to a subtracting circuit 402. At the comparing circuit 401, the values of the image signal DE and the binarized slice value S are compared, and the binary output N is output as follows:

in the event that DE>S; N=1,
in the event that DE≦S; N=0

Also, at the subtracting circuit 402, the value of the image signal DE is subtracted from the mean density calculation value m, and this is output as binarized error data E. Accordingly, the binarized error data E obtained from the subtracting circuit 402 is as follows:

$E = m - DE$

Figure 5:
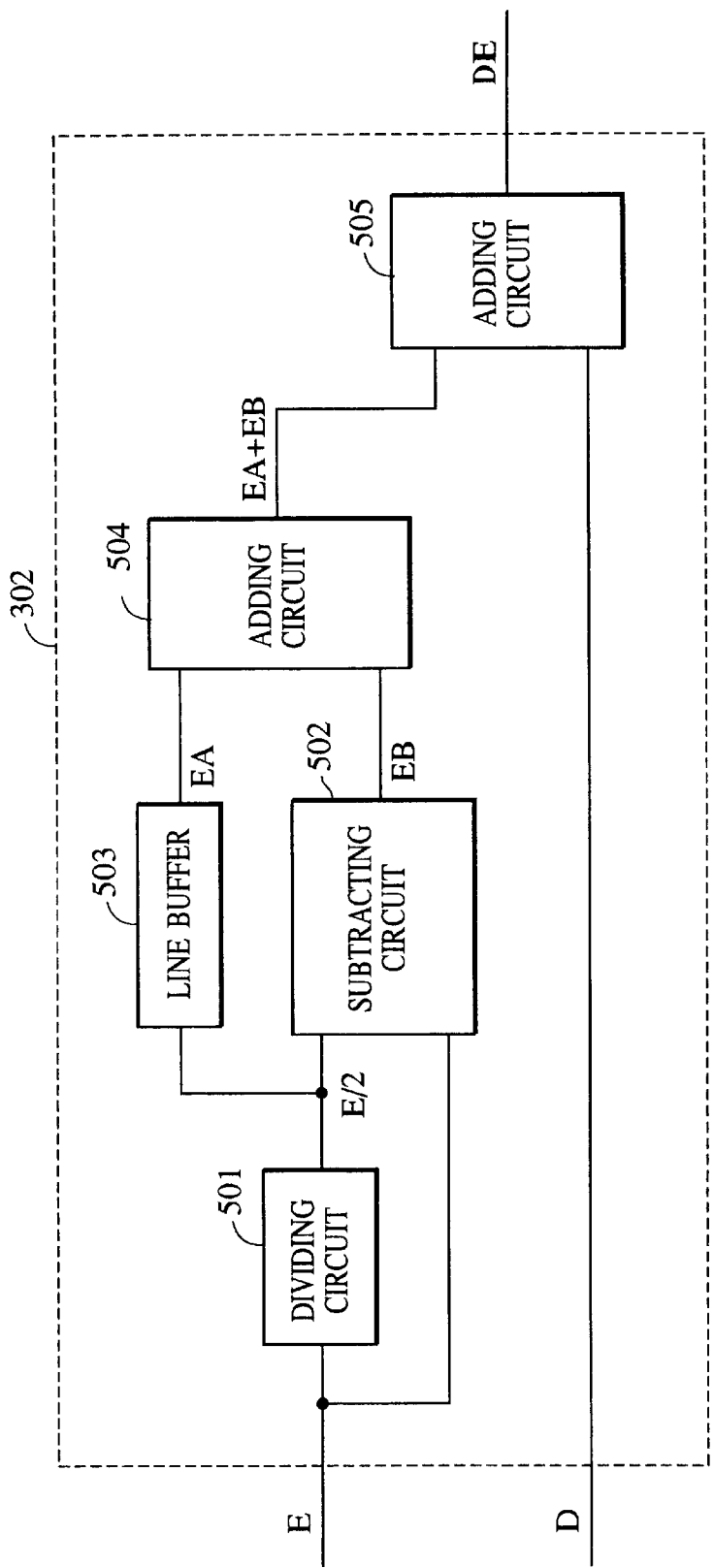
FIG. 5 is a block diagram illustrating the configuration of the margin of error correction unit 302.
Figure 6:
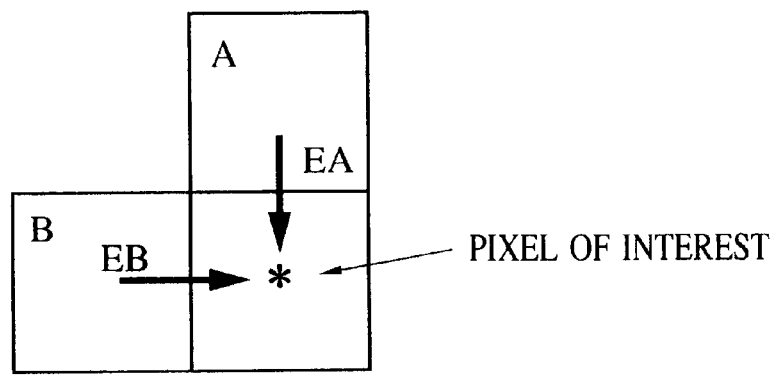
FIG. 6 is a block diagram illustrating the operation of the margin of error correction unit 302.

Next, description shall be made regarding the margin of error correction unit 302. FIG. 5 is a block diagram illustrating the margin of error correction unit 302. Also, FIG. 6 is a diagram describing the operation of the margin of error correction unit 302. As shown in FIG. 5, the margin of error correction unit 302 inputs the image signals D and the binarized error data E, calculates image signals DE which are the image signals D to which error correction has been performed, and outputs the image signals DE to the binarizing unit 301. The input binarized error data E is halved by dividing circuit 501. The results thereof are split into two systems, one being input to the subtracting circuit 502, and the other to a line buffer 503.

At the subtracting circuit 502, the difference EB between the input binarized error data E and E/2 is calculated, and the results are input to an adding circuit 504. Now, the reason that the trouble is taken to perform the calculation E−E/2 at this time, is to prevent the remainder from being discarded.

That is to say, since E/2 which is calculated at the dividing circuit 501 is input to the line buffer 503, the remainder of E/2 is discarded in the event that E is an odd value. Accordingly, the value which is to be input to the adding circuit 504 has to be calculated by E−E/2; otherwise, the cut remainder will be discarded. Also, the adding circuit 504 calculates the sum of EA and EB which have been delayed one line by means of the line buffer which consists of several bits (8 bits in the case of the present embodiment) for one line, and this is output to an adding circuit 505. At the adding circuit 505, sum of EA and EB which have been delayed one line, and the sum of the image signal D are calculated, this being output as image signal DE.

In other words, as shown in FIG. 6, the margin of error correction unit 302 performs processing of adding to the pixel of interest the following: binarized margin of error EA generated by binarizing pixel A on the line one above the pixel of interest, and the binarized margin of error EB generated by binarizing pixel B one prior thereto.

Figure 8:
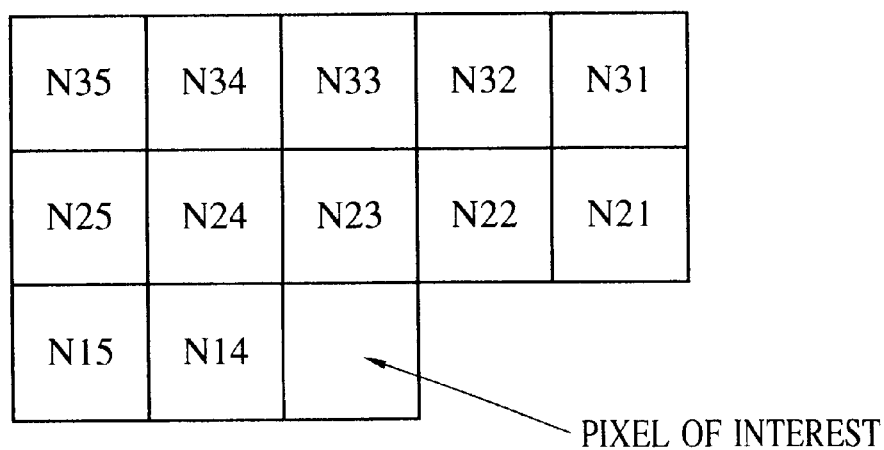
FIG. 8 is a diagram describing the binarized results output from the binarized results delay unit 303.

Next, description shall be made regarding the binarized results delay unit 303. FIG. 7 is a block diagram illustrating the configuration of the binarized results delay unit 303. Also, FIG. 8 is a diagram describing the binarized results Nmn output from the binarized results delay unit 303. As shown in FIG. 7, the binarized results delay unit 303 inputs the binarized output N from the binarizing unit 301, performs delaying of the certain number of lines, and outputs the multiple binarized results Nmn shown in FIG. 8 to the mean density calculating unit 304.

The input binarized output N is sent from a line buffer 601 regarding which one bit is one line, to a line buffer 602, and the data is delayed per line.

Also, data which is not delayed is sequentially delayed by one pixel, by means of delays 603 through 606, comprised of single-pixel delay circuits. Then, the output of the delay 605 and the output of the delay 606 are both output as N14 and N15. In the same way, the binarized data which has been delayed by one line by means of the line buffer 601 is delayed by delays 607 through 610, and output as N21 through N25; and the binarized data which has been delayed by one more line by means of the line buffer 602 is delayed by delays 611 through 614, and output as N31 through N35.

In other words, at the binarized results delay unit 303, delay processing is performed for multiple lines and multiple pixels regarding binarized data N comprised of a two-dimensional image which has been binarized. This becomes the binarized results Nm of multiple lines, and the binarized results of pixels at positional relations with the pixel of interest as shown in FIG. 8 are input to the mean density calculating unit 304.

Figure 9:
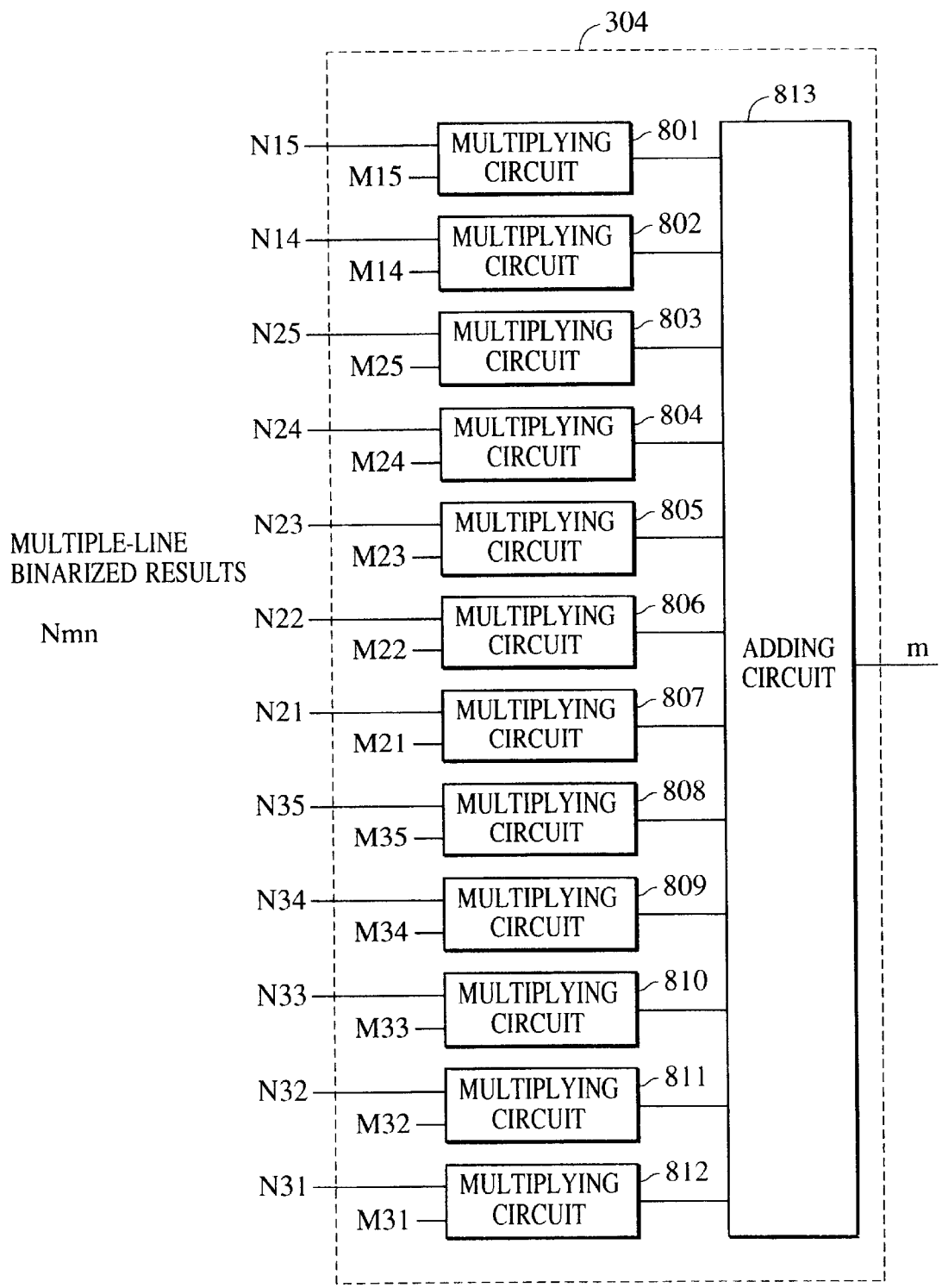
FIG. 9 is a block diagram illustrating the configuration of the mean density calculating unit 304.

Next, description shall be made regarding the mean density calculating unit 304. FIG. 9 is a block diagram describing the configuration of the mean density calculating unit 304. Also, FIG. 10 is a diagram illustrating an example of coefficients for the mean density calculating unit 304. At the mean density calculating unit 304, the binarized results Nmn for multiple lines are input from the binarized results delay unit 303, the sum of products is calculated with coefficients set beforehand (FIG. 10). The result is output as the mean density value m. This mean density value m is used by the binarizing unit 301 and the slice value control unit 305.

A multiplying circuit 801 inputs the binarized data N15 and the coefficient M15, and outputs the results of the two. Also, a multiplying circuit 802 inputs the binarized data N14 and the coefficient M14, and outputs the results of the two. Similar calculations are performed with all of the multiplying circuits 803 through 812, and all of the multiplication results are added by an adding circuit 813. Then, the results are output as the mean density calculated value m. Incidentally, an example of the coefficient Mmn shown in FIG. 9 is illustrated in FIG. 10. FIG. 10 shows the coefficients of the pixel positions corresponding with each Nmn.

Figure 11:
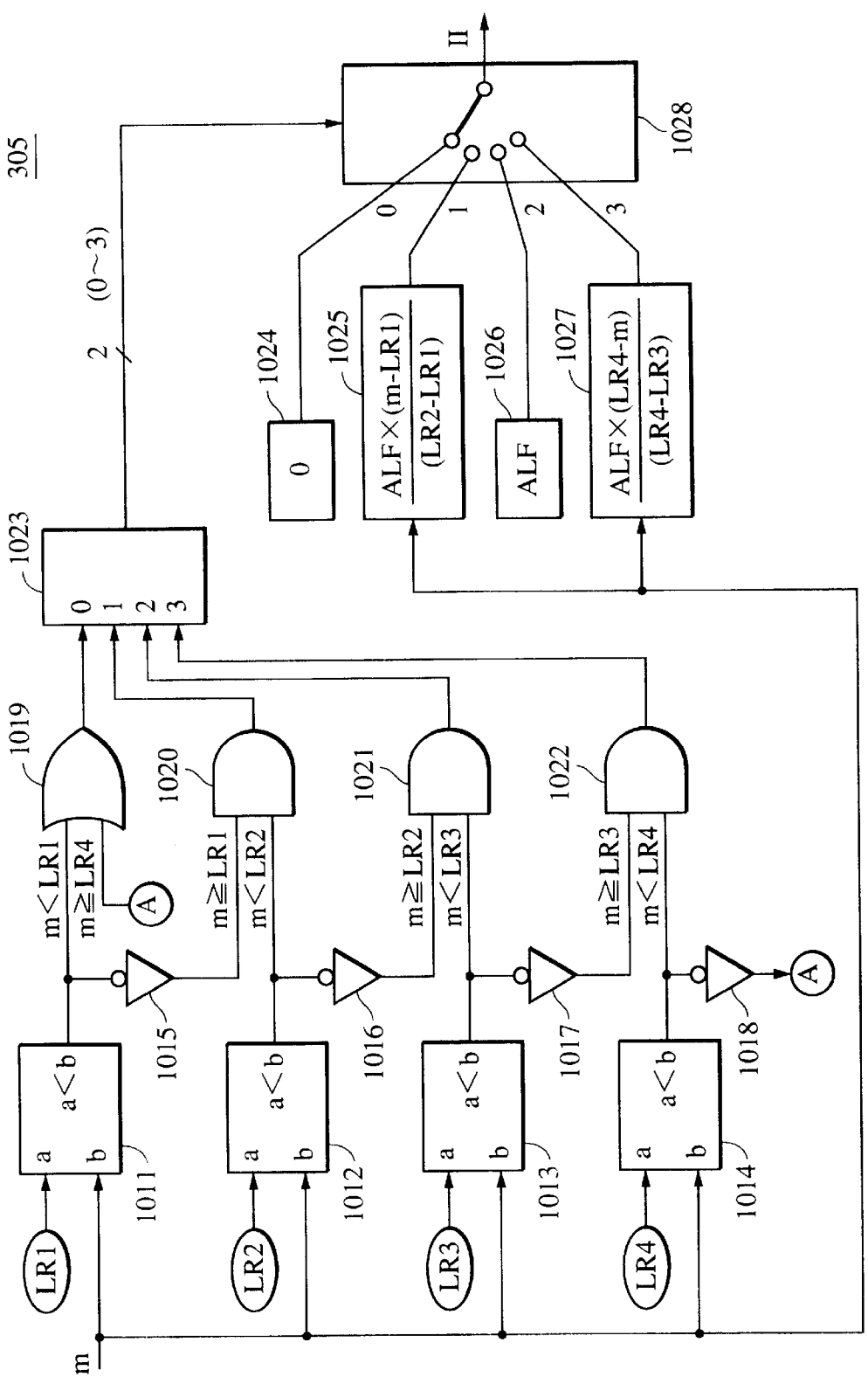
FIG. 11 is a block diagram illustrating the configuration of the slice value control unit 305.

Next, description shall be made regarding the slice value control unit 305. FIG. 11 is a block diagram illustrating the configuration of the slice value setting unit 305. In FIG. 11, 1011 through 1014 represent comparing devices, which output "1" in the event that the input value "a" is smaller than the input value "b". 1015 through 1018 represent inverters, which invert and output the input value. 1019 is an OR gate, and 1020 through 1022 are AND gates. 1023 is an encoder, which outputs numerical values 0 through 3 according to input to the input terminals 0 through 3. 1024 and 1026 are both constant generating devices for generating constants "0" and "ALF", respectively. Also, 1025 and 1027 are calculators which calculate using the mean density value m and constants LR1 through LR4. 1028 denotes a selector which outputs numerical values 0 through 3 according to input to the input terminals 0 through 3.

According to such a circuit configuration, the slice value change amount II is calculated based on the mean density calculated value m and the constants LR1/LR2/LR3/LR4, and the results thereof are output. FIG. 12 is a diagram describing the operation of the configuration shown in FIG. 11. Here, programming language C has been used for description, in order to clarify the explanation. Though FIG. 11 shows the slice value setting unit 305 being configured of hardware, it may be realized with software, as shown in FIG. 12.

In FIG. 12, first, in the event that the input mean density calculated value m (which may be any number in the range of 0–255) is smaller than the constant LR1 (e.g., 32), processing is performed at 1001 to set the slice value change amount II to 0. That is, in the event that m<LR1, the output of the comparing device 1011 shown in FIG. 11 is "1", the output of the OR gate 1019 is "1", and the constant number device 1024 is selected by the selector 1028.

Also, in the event that the input mean density calculated value m is equal to or greater than the constant LR1 but smaller than the constant LR2 (e.g., 128), processing is performed at 1002 to calculate the slice value change amount II according to the following expression:

$$II=ALF\times(m-LR1)/(LR2-LR1) \qquad (1)$$

wherein ALF is a constant (e.g., 32)

Figure 13:
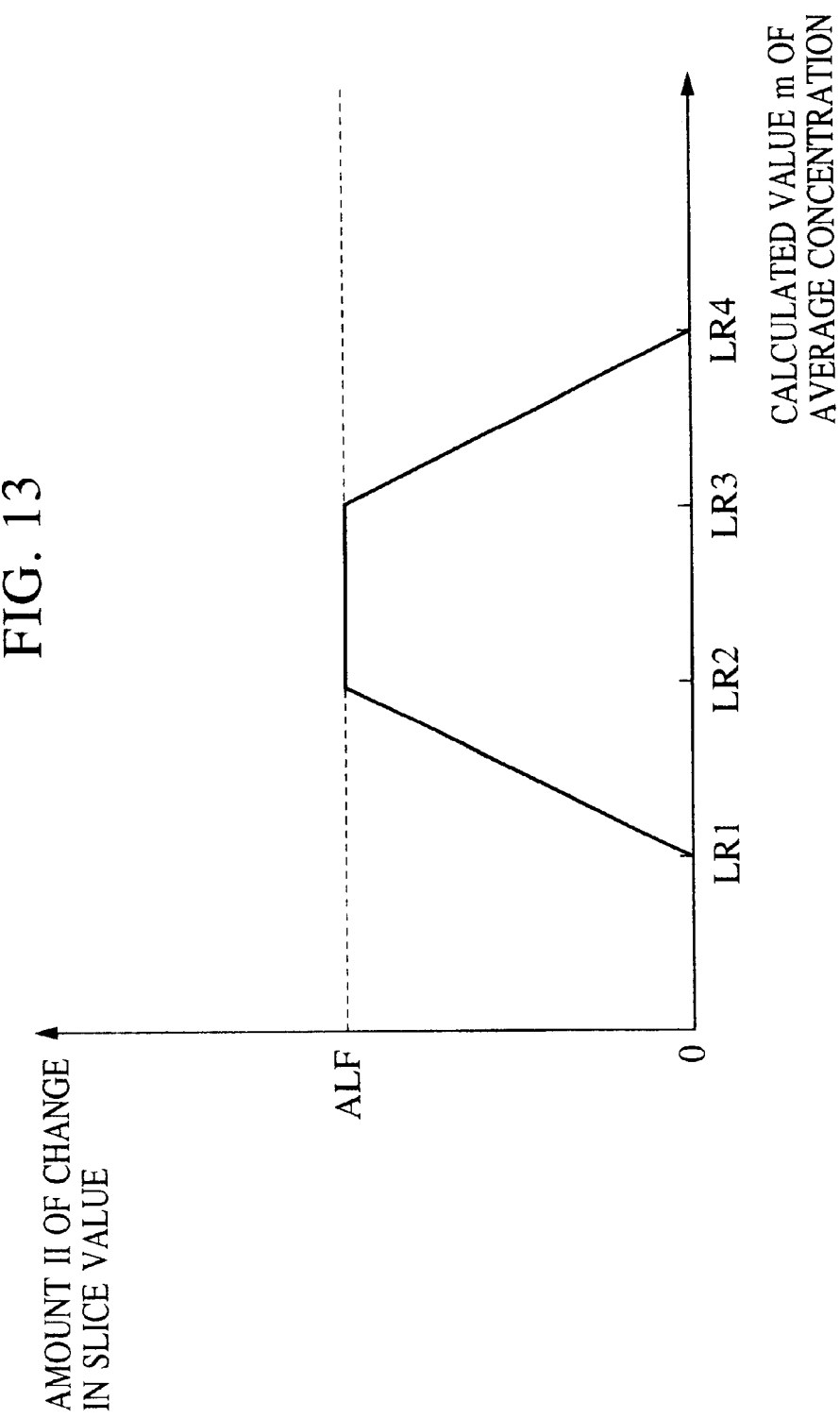
FIG. 13 is a diagram describing the amount of change in slice value by the slice value control unit of the first embodiment.

According to this calculation, the value of the slice value change amount II gradually approaches ALF from 0, as the value of the mean density calculated value m increases from LR1 to LR2 (See FIG. 13). The operation in FIG. 11 in this case is such that the output of the comparing device 1011 is "0", the output of the comparing device 1012 is "1", and the output of the AND gate 1020 is "1". Then, "1" is output from the encoder 1023, and the selector 1028 selects the output of the calculating device 1025. Now, calculation of the above Expression (1) is performed at the calculating device 1025.

Similar processing is performed at 1003, 1004, and 1005.

In the event that the input mean density calculated value m is equal to or greater than the constant LR2, but smaller than the constant LR3 (e.g., 192), processing is performed at 1003 to set the slice value change amount II to the constant ALF. Also, in the event that the input mean density calculated value m is equal to or greater than the constant LR3 but smaller than the constant LR4 (e.g., 250), processing is performed at 1004 to calculate the slice value change amount II according to the following expression (2):

$$II=ALF\times(LR4-m)/(LR4-LR3) \qquad (2)$$

In this case, contrary to 1002 above, the value of the slice value change amount II gradually approaches 0 from ALF, as the value of the mean density calculated value m increases from LR3 to LR4 (See FIG. 13). Further, in the event that the input mean density calculated value m is equal to or greater than the constant LR2, processing is performed at 1005 to set the slice value change amount II to 0. Thus, according to the above processing, the slice value change amount II of the slice value control unit 305 changes according to the value of the mean density calculated value m.

Incidentally, the values LR1 through LR4 and ALF set to the constant generating devices 1011 through 1014 can each be set to desired values by the operating unit 111.

Figure 14:
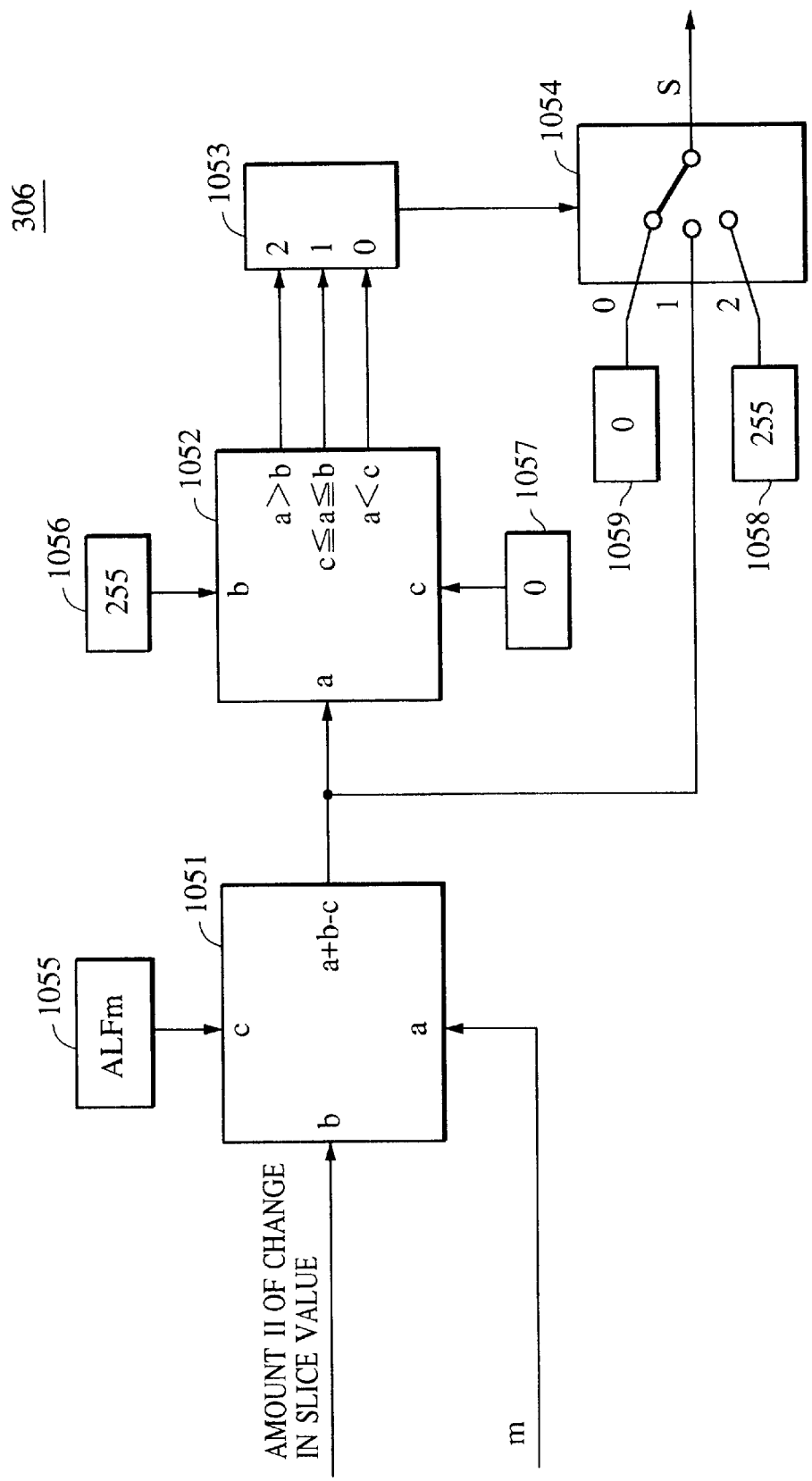
FIG. 14 is a block diagram illustrating the configuration of the adding unit 306.

FIG. 14 is a block diagram illustrating the configuration of the adding unit 306. The adding unit 306 inputs the output value m of the mean density calculating unit 304 and the slice value change amount II of the slice value control unit 305, performs adding processing, applies a limit of a constant 0 or constant 255 to values under 0 or over 255. The results thereof are output as the binary slice value S. That is, processing represented by the following expression is performed.

$$S=m+II-ALFm$$

$$\text{if } (S>255)\{S=255;\}$$

$$\text{if } (S<0)\{S=0;\} \qquad (3)$$

Now, ALFm (e.g., 16) is a constant and can be set anywhere between –255 and 255. Incidentally, the setting of this constant ALFm can be performed from the operating unit 111.

In FIG. 14, 1051 denotes an adding device, whereby the inputs a, b, and c are calculated according to a+b−c and the results are output. 1052 is a comparing device, and in the event of the cases of a>b, c≦a≦b, and a<c, "1" is output from the corresponding output terminal. 1053 is an encoder, and 0 through 3 is output in binary according to input to the input terminals 0, 1, and 2. 1054 is a selector, and one of the input signals from the terminals 0, 1, and 2 is selected according to the value (0 through 2) of the selected signal, and is output from the output terminal 1055 through 1059 are constant devices. In the above configuration, connection such as illustrated in FIG. 14 yields a binary slice value S as described above.

According to such calculation by the adding unit 306 (Expression (3) above), the binary slice value S is controlled for each desired concentration area, by means of the slice value change amount II of the slice value control unit 305.

By means of sequentially carrying out such processing for each pixel, in the event that the slice value change amount II changes greatly in the positive direction, the binary slice value S is increased, and the binary output N at the binarizing unit 301 shown in FIG. 4 tends toward being "0". In other words, dots are not readily printed. However, in the event that the binary output remains "0" for a certain amount of time, a great quantum margin of error is accumulated instead, and this is added to the image signal D, so the binary output N tends toward being 1. In other words, dots are more readily printed.

Consequently, areas where dots are printed and areas where dots are not printed become concentrated, thereby enabling concentration control of the dots. As described with reference to FIGS. 11–13, control can be made at arbitrary concentration areas.

Also, by means of setting the ALF value of the slice value control unit 305 to a negative value, the binary slice value can be reduced according to the mean density calculated value m, contrary to the above description, so control can be made in the direction of scattering the dots (the dots are not concentrated).

Further, by setting ALF shown in FIG. 12 to a positive value and also setting ALFm at the adding unit 306 to a positive value other than 0, compounded control can be made wherein dots can be concentrated or dispersed at arbitrary areas.

Of course, it is needless to say that setting ALF and ALFm to negative values yields results reverse to those above.

Thus, according to the above-described processing, multi-value image data can be converted into binary data and output while controlling the texture of dots at arbitrary concentration areas.

Second Embodiment

Next, a second embodiment shall be described in detail. Here, the overall configuration of the photocopier in the second embodiment is the same as that of the first embodiment (FIGS. 1–2). Also, while description shall be made regarding the gradient conversion processing unit 204, the portions thereof which are the same as those in the first embodiment shall be denoted by the same reference numerals, and description thereof shall be omitted.

Now, with regard to the configuration of the gradient conversion processing unit according to the first embodiment shown in FIG. 3, in the event that the video clock of the image signals D being sent reaches high speeds, the timing for obtaining binary slice value is critical. This is because the results of the slice value control unit 305 are obtained regarding the binarized slice value S following the results of the mean density calculating unit 304 being output, and further those results are used for calculating with the adding unit 306, despite the fact that processing should be proceeding at the same speed as the video clock between the mean density calculating unit 304 and the binarizing unit 301.

Accordingly, the calculating unit calculating the binarized threshold value S for the second embodiment has been changed, so as to allow dealing with high-speed video clocks, as well. That is, the slice value changing amount II which had been determined based on the mean density calculated value m in the first embodiment, is determined based on random numbers and input image signals in the second embodiment. The following is a description of the second embodiment.

<Gradient Conversion Processing Unit>

Figure 15:
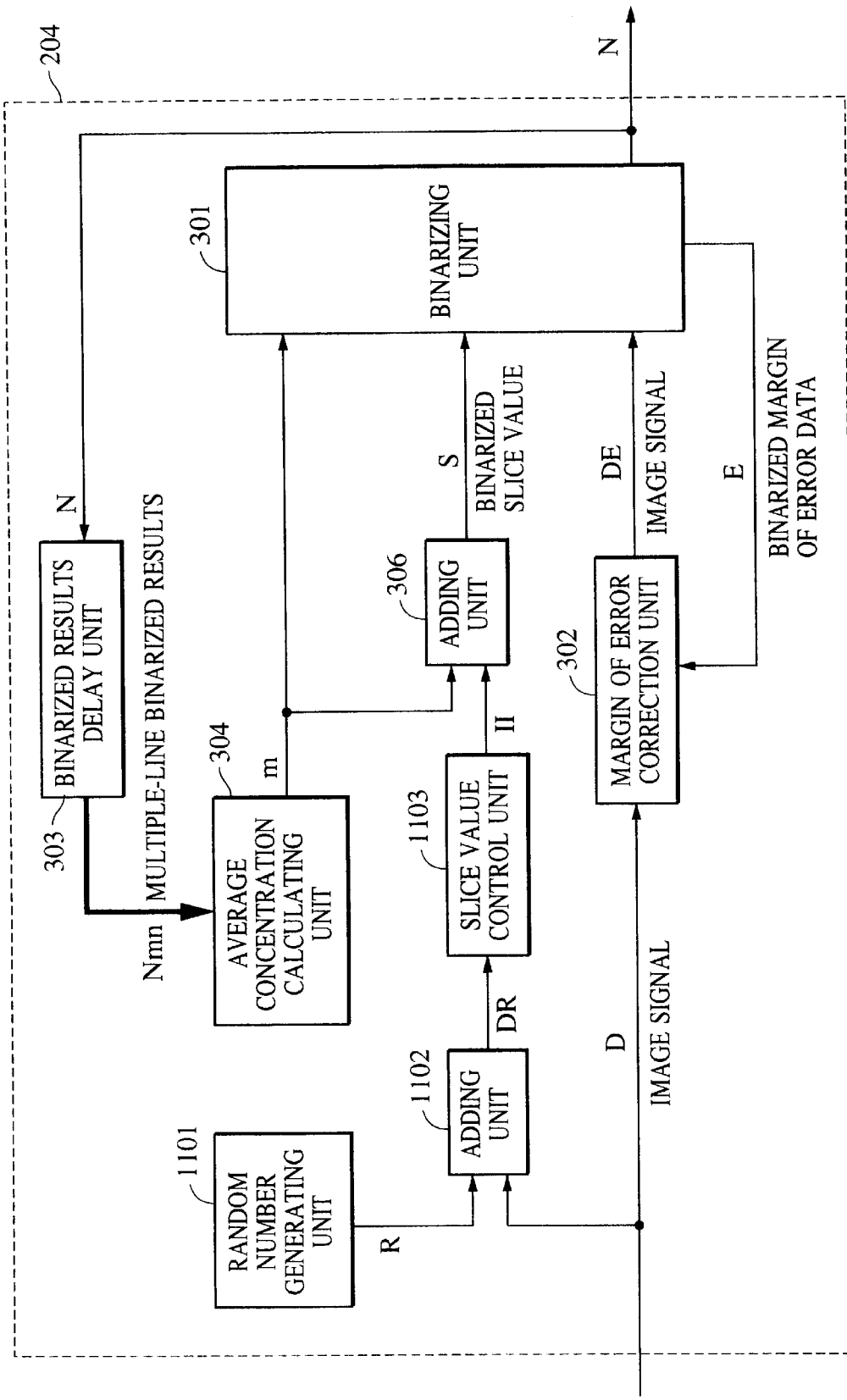
FIG. 15 is a block diagram illustrating the configuration of the gradient conversion processing unit according to a second embodiment.
Figure 16:
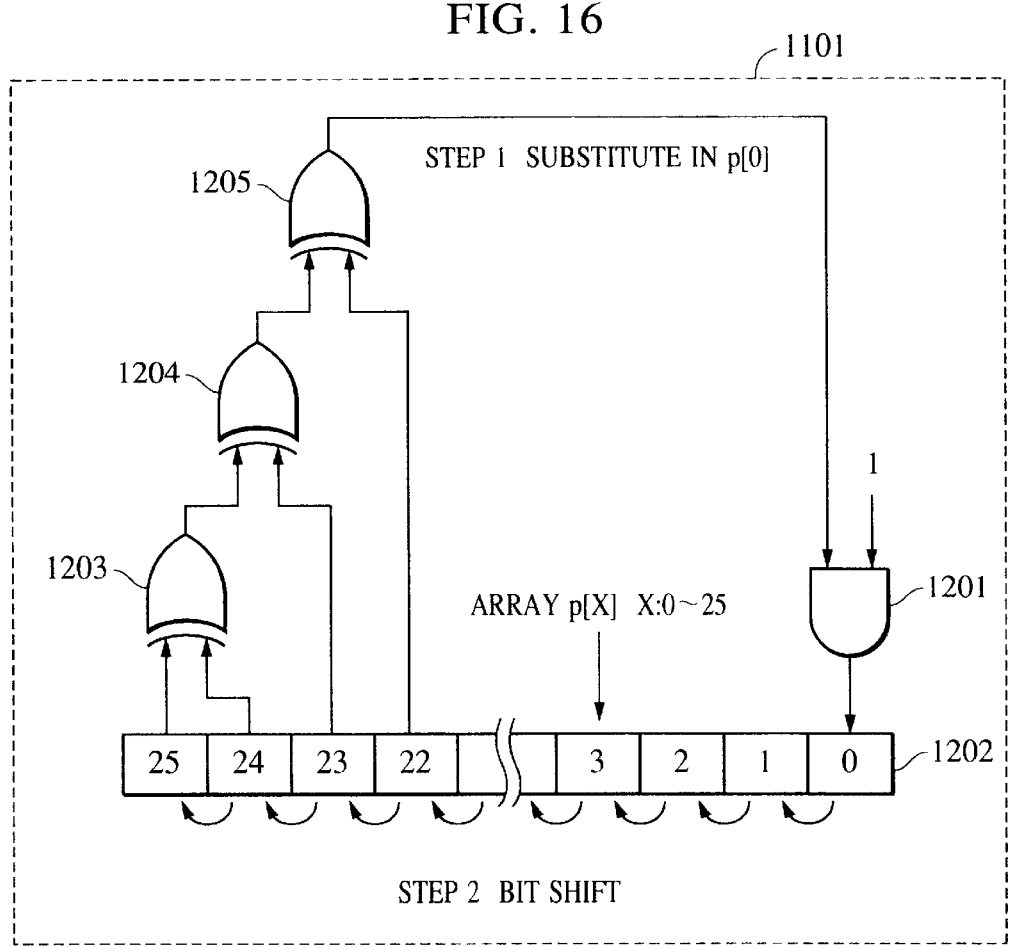
FIG. 16 is a block diagram illustrating the configuration of the random number generating unit according to the second embodiment.

FIG. 15 is a block diagram illustrating the configuration of the gradient conversion processing unit according to the second embodiment. In FIG. 16, a random number generating unit 1101 is configured of an m number of series of shift register code series generating devices. With the number of tiers of shift registers as N, pseudo-random numbers with a 2N−1 cycle can be easily generated with a simple hardware configuration. With the present configuration, 25-tier 1-bit shift registers are used so that the cycle does not show up even if an A4 original is processed at 400 dpi. This 25 tier shift register is based on an m number of series of random numbers, and does not reach a cycle for the number of pixels in an A4 original at 400 dpi. These figures can be logically calculated.

Regarding shift register 1202, the random number generating device writes "0" to the registers which are p[ii]: (0≦ii≦25), and "1" only to the register which is p[12]. Incidentally, 1203 through 1205 are each XOR gates. Further, p[0]=((p[25]^p[24]^p[23]^p[22])&1) is calculated each time before a random value is output, calculating the random number using the register values p[17]–p[21] of the shift register 1202. That is, the configuration is such that a random value from −31 to 31 is output by means of:

random number=(1−2*p[2])*(p[17]*16+p[18]*8+p[19]*4+p[20]*2+p[21])

Incidentally, through random numbers from −31 to 31 are used in the second embodiment, the random number generating unit may be altered to output random numbers from −15 to 15, according to:

random number=(1−2*p[2])*(p[18]*8+p[19]*4+p[20]*2+p[21]).

Of course, the value of the random number can be made to be 0 as well, but it is preferable to use data with a certain degree of random number attached thereto in order to change the binarized slice value and naturally perform texture control.

Adding unit 1102 is a processing unit which adds the output value R of the random number generating unit 1101 and the input value D of the gradient conversion processing unit 204 to calculate the output value DR. Now, while not shown in the Figure, the adder 1102 has a limiter whereby the addition results are forced to 0 in the event that the results are less than 0, and to 255 in the event that the results exceed 255. That is to say, processing represented by the following expression is carried out:

DR=R+D if (DR>255){DR=255;} if (DE<0){DE=0;}        (4)

Slice value control unit 1103 receives the value DR from the adding unit 1102 and calculates and outputs the slice value converting amount II. FIG. 17 is a diagram illustrating the operation of the slice value control unit 1103 according to the second embodiment. Here, programming language C has been used for description, in order to clarify the explanation, as with the first embodiment. It will be clear to those skilled in the art that the slice value control unit 1103 may be configured of hardware, as shown in FIG. 11 with reference to the first embodiment.

In FIG. 17, in the event that the output value DR of the adding unit 1102 which has been input (which may be any number in the range of 0–255) is smaller than the constant LR1 (e.g., 32), processing is performed to set the slice value change amount II to 0.

Also, in the event that the input signal DR is equal to or greater than the constant LR1 but smaller than the constant LR2 (e.g., 128), the slice value change amount II is calculated according to the following expression (5):

II=ALF×(DR−LR1)/(LR2−LR1)        (5)

wherein ALF is a constant (e.g., 32).

According to this calculation, the value of the slice value change amount II gradually approaches ALF from 0, as the value of the input signal DR increases from LR1 to LR2.

Similar processing is performed at 1303, 1304, and 1305. That is to say, in the event that the input signal DR is equal to or greater than the constant LR2, but smaller than the constant LR3 (e.g., 192), processing is performed at 1303 to output the slice value change amount II as the constant ALF. Also, in the event that the input signal DR is equal to or greater than the constant LR3 but smaller than the constant LR4 (e.g., 250), processing is performed at the unit 1304 to calculate the slice value change amount II according to the following expression (6):

$$II=ALF \times (LR4-DR)/(LR4-LR3) \quad (6)$$

In this case, contrary to the above 1302, the value of the slice value change amount II gradually approaches 0 from ALF, as the value of the input signal DR increases from LR3 to LR4. Also, in the event that the input signal DR is equal to or greater than LR4, 1305 performs processing to set the slice value change amount II to 0.

Thus, according to the above processing, the slice value change amount II which is the output value of the slice value control unit 1103 is controlled as shown in FIG. 13 by means of the value of the signal DR input from the adding unit 1102. It should be noted though, that in the second embodiment, the horizontal axis in FIG. 13 is the input signal DR in the second embodiment.

As described above, according to the second embodiment, the binarized slice value change amount II can be calculated from the image signal D and random number R, regardless of the value of the mean density calculated value m. In other words, the binarized slice value change amount II can be calculated in parallel while the output value m of the mean density calculating unit 304 is being calculated. Accordingly, there is leeway in the timing between the mean density calculating unit 304 and the binarizing unit 301. Consequently, the present method is effective regarding high-speed video clock.

Incidentally, the binarized slice value S finally input to the binarizing unit 301 is calculated by:

$$S=m+II-ALFm$$

at the adding unit 306 as with the first embodiment.

As a result, as with the first embodiment, the degree of concentration of binarized dots can be freely controlled at arbitrary areas. That is, dots can be concentrated or dispersed at arbitrary areas.

Third Embodiment

Next, the third embodiment shall be described. It holds for both the known methods and the methods described in the above embodiments that precise texture control cannot be conducted only by controlling the n-value-izing threshold value for dot concentration based on the amount of input image signals or the amount of input image signals added with random numbers. In the same way, precise texture control cannot be conducted only by controlling the n-value-izing threshold value with added amounts of past binarization results being weighted and added. Now, the third embodiment realizes precise texture control. Incidentally, the overall configuration of the photocopier in the second embodiment is the same as that of the first embodiment (FIGS. 1–2). Also, while description shall be made regarding the gradient conversion processing unit 204, the portions thereof which are the same as those in the first embodiment shall be denoted by the same reference numerals, and description thereof shall be omitted.

<Gradient Conversion Processing Unit>

Figure 18:
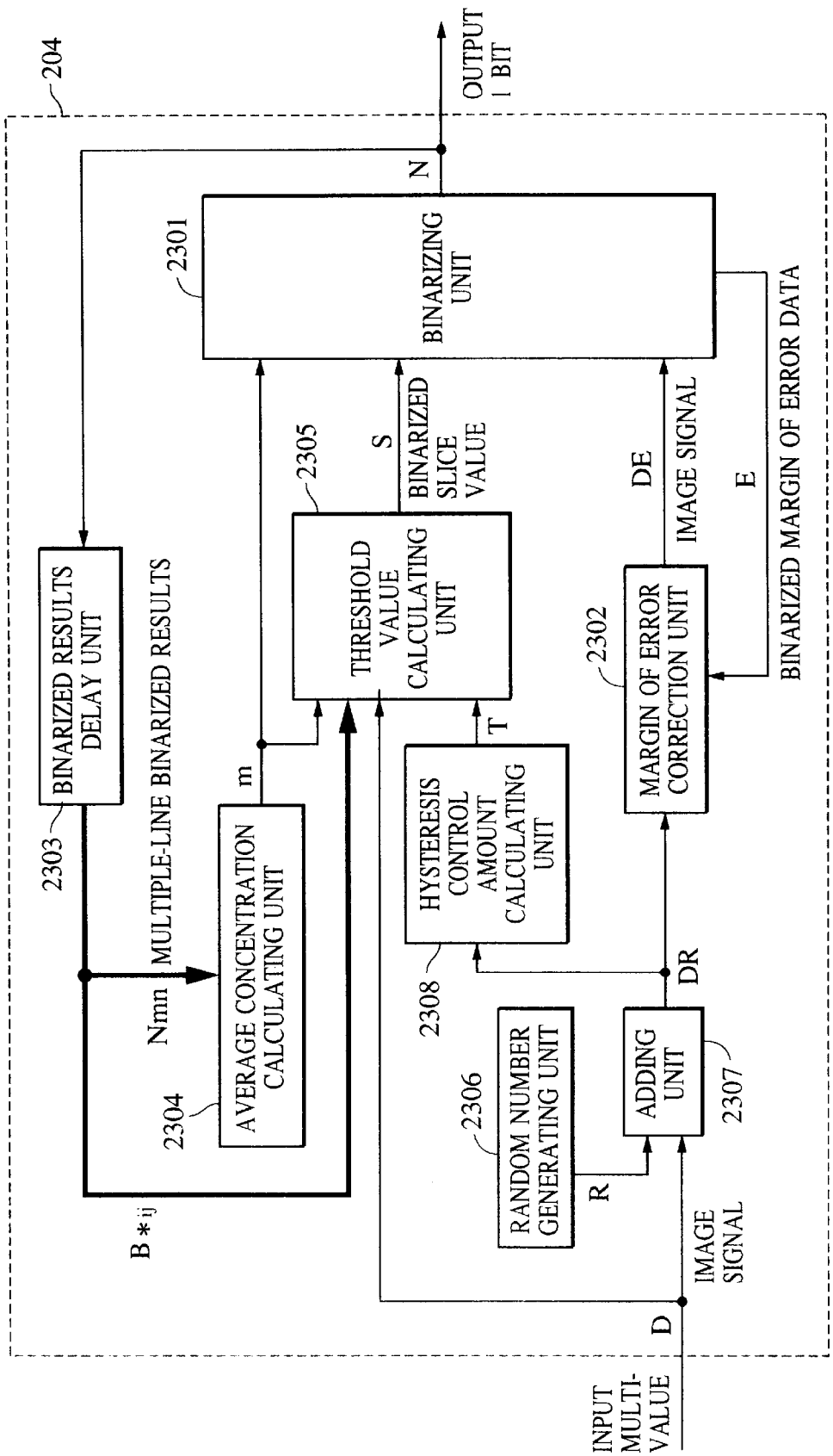
FIG. 18 is a block diagram illustrating the detailed configuration of the gradient conversion processing unit according to a third embodiment.

FIG. 18 is a block diagram illustrating the detailed configuration of the gradient conversion processing unit according to the third embodiment. The MD method has been employed for the pseudo half-tone processing method in this embodiment, as well.

The margin of error correction unit 2302 inputs the signal DR comprised of image signals D from the color/monochrome converting unit 203 to which later-described random numbers are added. The binarized error data E generated in the later-described binarizing processing unit 2301, performs later-described margin of error correction and calculates the image signal DE. The image signal DE obtained by error correction unit 302 is input to binarizing unit 2301.

The binarizing unit 2301 inputs the image signal DE, the binarized slice value S, and the mean density calculated value m, calculates the binary output N by means of comparing the image signal DE with the binarized slice value S, and then calculates the binarized error data E by means of subtracting the image signal DE and he mean density calculated value m.

The binarized results delay unit 2303 inputs the binary output N, performs delay of a certain number of lines, and obtains binarized results B*ij for a plurality of lines. Then, Nmn is input to the mean density calculating unit 2304, and B*ij to a threshold value calculating unit 2305.

The mean density calculating unit 2304 inputs the binarized results Nmn for multiple lines, and yields the sum of products between pre-set coefficients and delayed binary results, thereby obtaining the mean density calculation value m. The obtained mean density calculation value m is output to the threshold value calculating unit 2305 and binarizing unit 2301.

The mean density calculation value m output from the mean density calculation unit 2304, B*ij output from the binarized results delay unit 2303, input multi-value data D, and an output T of a hysteresis control amount calculating unit 2308 are input to the threshold value calculating unit 2305. The threshold value control amount is calculated for each concentration range based on the past binarization state (pattern) indicated by the B*ij signals, and outputs the threshold value control amount to the binarizing unit 2301 as binarized slice value S.

Random number generating unit 2306 generates an m number of series of random numbers between −17 and +17 according to a later-described method. At the adding unit 2307, the image signal D input to the gradient processing unit 204 and the random number R from the random number generating unit 2306 are added, yielding the signal DR. At this time, while not shown in the Figures, limiting processing is performed so that the addition results DR fit within the range of 0 to 255, and Dr is output from the adding unit 2307 (details described later).

The hysteresis control amount calculating unit 2308 controls the threshold value according to the output signal DR from the adding unit 2307. The details of each of the processing units will now be described in detail with reference to the drawings.

The binarizing unit 2301 has the same configuration as the binarizing unit 301 described in the first embodiment (FIG. 4). That is, the binarizing unit 2301 inputs the image signals DE, the later-described binarized slice value S, and the later-described mean density calculation value m, and by means of comparing these, outputs binary output N and binarized error data E. The input image signals DE are separated into two systems, one being input to the comparing circuit 401, and the other being input to the subtracting circuit 402.

At the comparing circuit, the values of the image signal DE and the binarized slice value S are compared, and the binary output N is output as follows:

in the event that DE>S; N=1,
in the event that DE≦S; N=0

Also, at the subtracting circuit 402, the value of the image signal DE is subtracted from the mean density calculation value m, and this is output as binarized error data E:

$$E = m - DE$$

Figure 19:
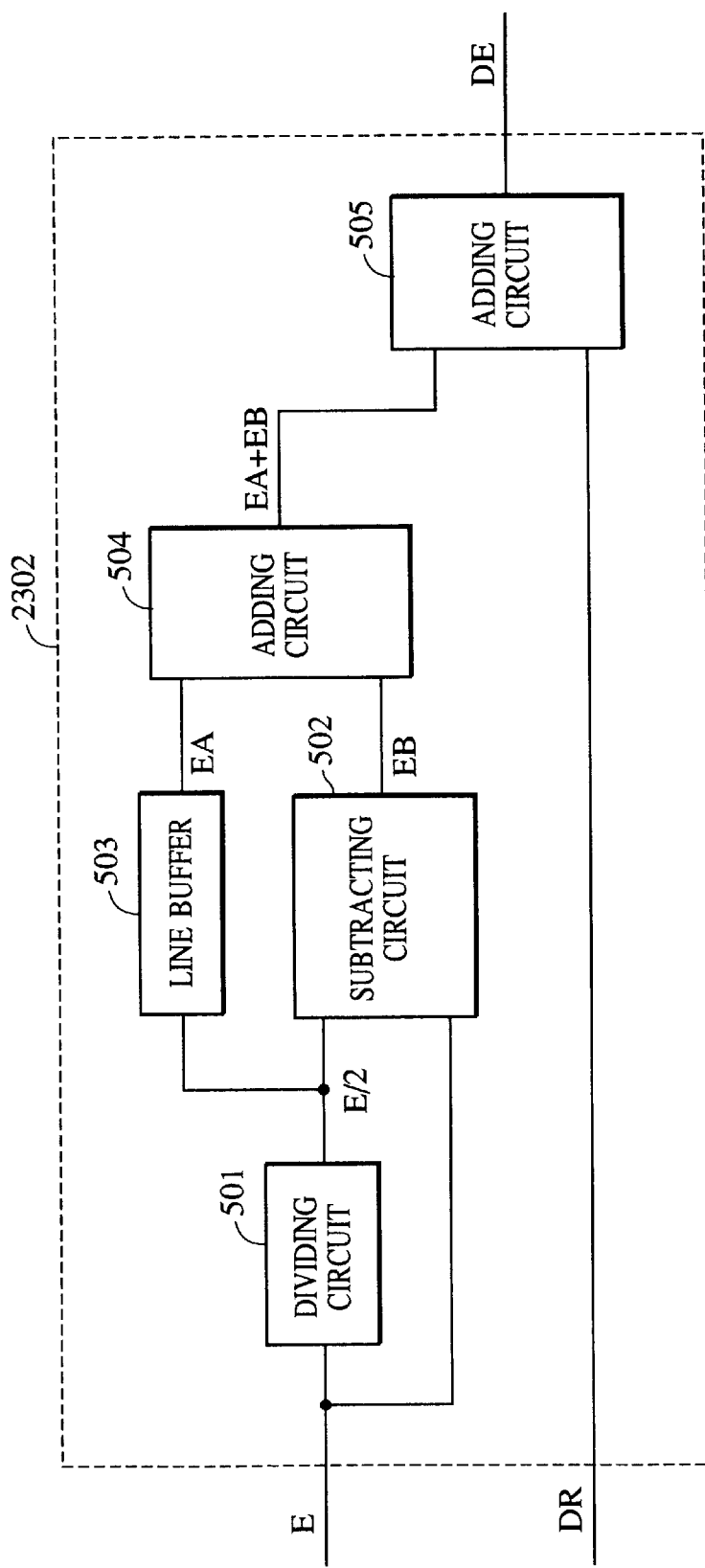
FIG. 19 is a block diagram illustrating the configuration of the margin of error correcting unit 2302 according to the third embodiment.

FIG. 19 is a block diagram illustrating the configuration of the margin of error correcting unit 2302 according to the third embodiment. The margin of error correction unit 2302 inputs the image signals DR which are the sum of the image signals D and the random number R from the random number generating unit 2307, and the binarized error data E, calculates image signals DE which are the image signals DR to which error correction has been performed. The image signal DE is output to the binarizing unit 2301. The margin of error correction unit 2302 has practically the same configuration as the margin of error correction unit 302 in the first embodiment; the difference is that while in the first embodiment image signals D are input, but in the second embodiment image signals DR are input, which represents the sum of the image signals D and the random number R from the random number generating unit 2306.

The input binarized error data E is halved by the dividing circuit 501. The results thereof are split into two systems, one being input to the subtracting circuit 502, and the other to the line buffer 503. At the subtracting circuit 502, the difference EB between the input binarized error data E and E/2 is calculated (=E−E/2). The result is input to an adding circuit 504. The adding circuit 504 calculates the sum of EA and EB which have been delayed one line by means of the line buffer which consists of several bits (8 bits in the case of the present embodiment) for one line. This is output to an adding circuit 505. At the adding circuit 505, the sum of EA and EB which have been delayed one line, and the sum of the image signal DR (image signal DE) are calculated, this being output.

Consequently, as shown in FIG. 6, the margin of error correction unit 2302 performs processing of adding to the image signals DR of the pixel of interest the following: binarized margin of error EA generated by binarizing the pixel A on the line one above the pixel of interest regarding the image signals DR corresponding with the pixel of interest, and the binarized margin of error EB generated by binarizing the pixel B one prior thereto.

Figure 20B:
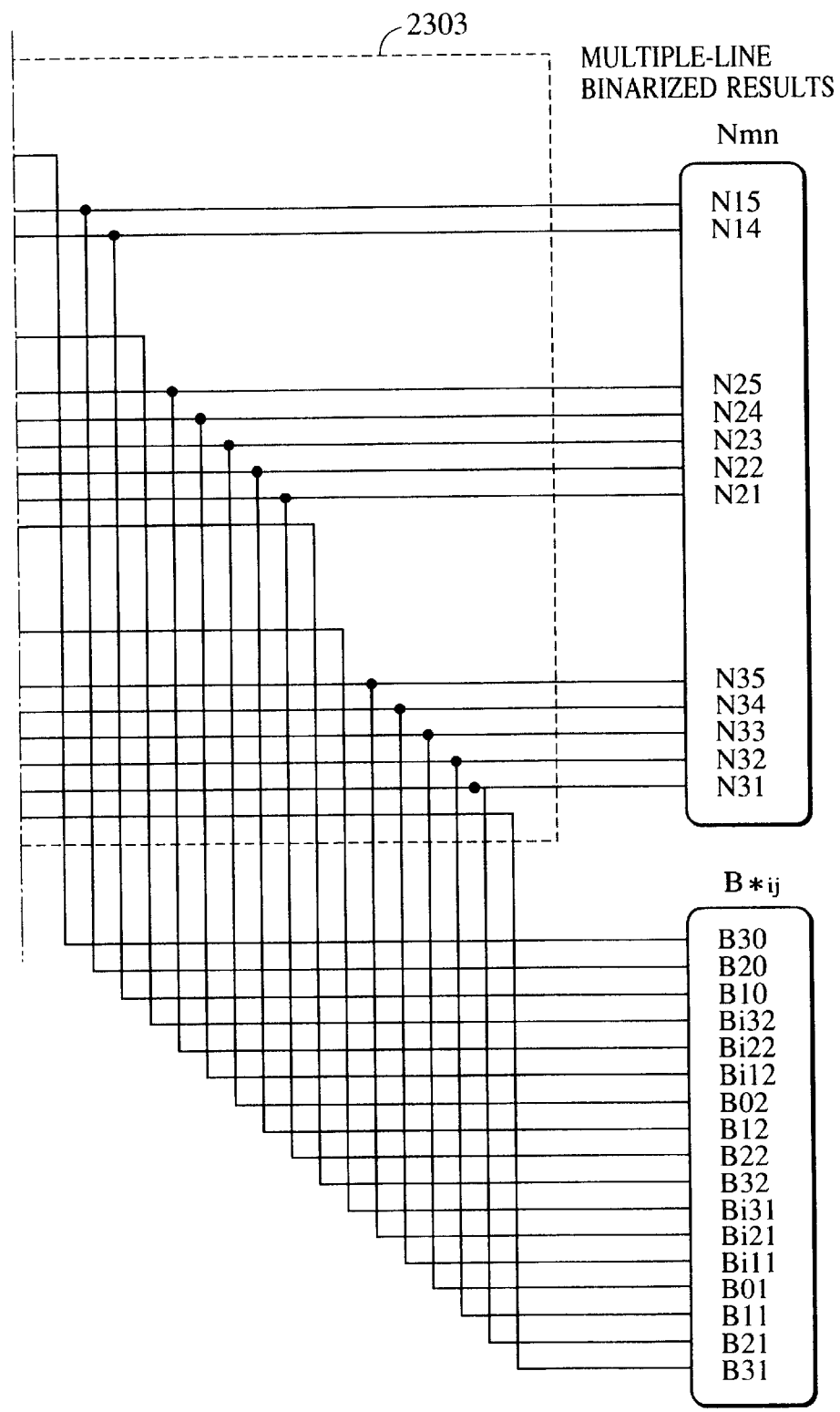

FIGS. 20A and 20B are block diagrams illustrating the configuration of the binarized results delay unit 2303 according to the third embodiment. The binarized results delay unit 2303 inputs the binarized output N, performs delaying of the certain number of lines, obtains the binarized results Nmn and B*ij for multiple lines, and outputs the results to the mean density calculating unit 2304 and threshold value calculating unit 2305.

In FIG. 20A, the input binarized output N is sent from a line buffer 601 regarding which one bit is one line, to a line buffer 602, and the data is delayed per line. Also, data which is not delayed is sequentially delayed by one pixel, by means of delays 603 through 608, comprised of single-pixel delay circuits. Then, the output of the delay 606 and the output of the delay 607 are both output as N14 and N15. The binarized data which has been delayed by one line by means of the line buffer 601 is delayed by delays 609 through 614, and the output of delays 609 through 613 is output as N21 through N25; and the binarized data which has been delayed by one more line by means of the line buffer 602 is delayed by delays 615 through 620, and the output of delays 615 through 619 is output as N31 through N35.

At the same time, the output of the delay 607 and delay 608 are output as B20 and B30. Also, the binarized data which has been delayed by one line by means of the line buffer 601 is delayed by the delays 609 through 614, and is output as B32 through B02 and Bi12 through Bi32, respectively. Further, the binarized data which has been delayed by one more line by means of the line buffer 602 is delayed by the delays 615 through 620, and output as B31 through B01 and Bi11 through Bi31, respectively.

In other words, at the mean density calculating unit 2304, delay processing is performed for multiple lines and multiple pixels regarding binarized data comprised of a two-dimensional image which has been binarized, this becomes the binarized results Nm of multiple lines, and as shown in FIG. 8, are input to the mean density calculating unit 304. Further, B*ij which is the binarized results of multiple lines ins output to the threshold value calculating unit 2305 shown in the following FIG. 24.

The mean density calculating unit 2304 inputs the binarized results Nmn for multiple lines, and yields the sum of products between pre-set coefficients and delayed binary results, thereby obtaining the mean density calculation value m which is used by the binarizing unit 2301 and threshold value calculating unit 2305, and is configures as described in FIGS. 9–10.

Figure 21:
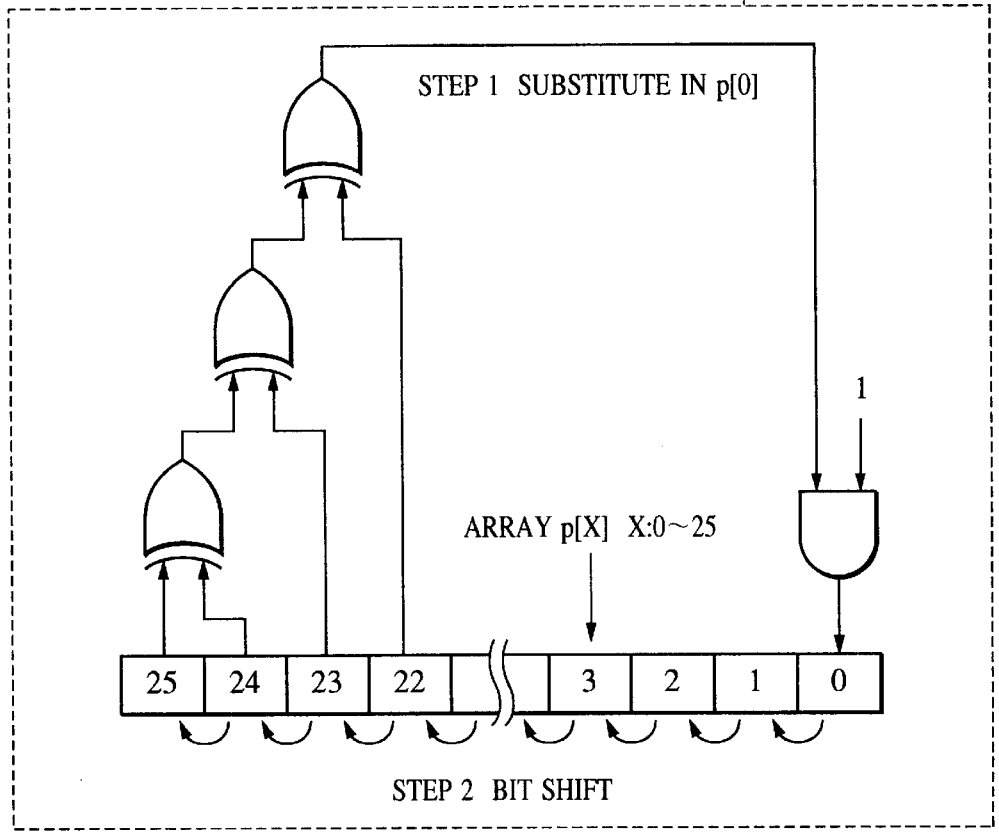
FIG. 21 is a block diagram illustrating the configuration of the random number generating unit according to the third embodiment.

The random number generating unit 2306 is configured of an m number of series of shift register code series generating devices, as shown in FIG. 21. With the number of tiers of shift registers as N, pseudo-random numbers with a 2N−1 cycle can be easily generated with a simple hardware configuration. With the present configuration, 25-tier 1-bit shift registers are used so that the cycle does not show up even if an A4 original is processed at 400 dpi. The configuration thereof is as described with reference to FIG. 16.

It should be noted though, that with the random number generating device according to the third embodiment, random numbers are generated in a range between −17 and 17. That is, at initialization, the random number generating device writes "0" to the registers which are p[ii]:(0≦ii≦25), Further, p[0]=((p[25]^p[24]^p[23]^p[22])&1) is calculated each time before a random value is output, and a random value between −17 to 17 is output by means of:

random number=(1−2*p[22])*((p[15]*64+p[16]*32+p[17]*16+p[18]*8+p[19]*4+p[20]*2+p[21]*17)/128)

Incidentally, through random numbers from −17 to 17 are used in the third embodiment, the random number generating unit 2306 may be altered to output random numbers from −15 to 15, according to:

random number=(1−2*p[2])*(p[18]*8+p[19]*4+p[20]*2+p[21]).

Of course, the value of the random number can be made to be 0 as well, but it is preferable to use data with a certain degree of random number attached thereto in order to change the binarized slice value and naturally perform texture control.

The adding unit 2307 is a processing unit which adds the image signal D input to the gradient processing unit 204 and the random number R from the random number generating unit. Now, the adding unit has a limiter whereby the addition results are set within the range of 0 to 255. That is to say, processing represented by the following expression is carried out at the adding unit 2307:

$$DR = D + R$$

if $(DR > 255)\{DR = 255;\}$ if $(DR < 0)\{DR = 0;\}$ and the obtained signal DR is output to the margin of error correction unit 2302 and hysteresis control amount calculating unit 2308.

The hysteresis control amount calculating unit 2308 changes the value of the slice value changing amount II according to the input signal DR, thereby generating and outputting the signal T. This is for adjusting the amount of hysteresis in an arbitrary area. Such control of the slice value changing amount II enables texture control in an arbitrary concentration area. FIG. 22 is a diagram illustrating the operation of the hysteresis control amount calculating unit 2308 according to the third embodiment. Here, programming language C has been used for description, in order to clarify the explanation.

The following is an example (FIG. 22) of the control method of the slice value changing amount II. That is, in the event that the input signal DR is equal to or less than the constant LR1 (e.g., LR1=16), processing is performed to set the slice value changing amount II to 0, and in the event that the input signal DR is greater than the constant LR1 but equal to or smaller than the constant LR2 (e.g., LR2=48), the slice value changing amount II is calculated by the following expression:

$$II=((DR-LR1)*(ALF*256/(LR2-LR1)))/256$$

According to this calculating, the value of II gradually approaches ALF from 0, as the value of the input signal DR increases from constant LR1 to constant LR2. ALF is a constant (32 in the present example).

Similarly, in the event that the input signal DR is greater than the constant LR2 but equal to or less than the constant LR3 (e.g., LR3=233), processing is performed to output the slice value changing amount II as a constant ALF, and further, in the event that the input signal DR is greater than the constant LR3 but equal to or smaller than the constant LR4 (e.g., LR4=255), the slice value changing amount II is calculated by the following expression:

$$II=ALF-((DR-LR3)*(ALF*256/(LR4-LR3)))/256$$

This indicates that the value of II gradually approaches 0 from ALF, as the value of the input signal DR increases from constant LR3 to constant LR4.

On the other hand, in the event that the input signal DR is greater than LR4, processing is performed to set the value of the slice value changing amount II to 0.

The constant ALFm (e.g., AFLm=16) is subtracted from the slice value changing amount II obtained as described above, and the results of the subtraction are output as output signal T. The purpose of this subtraction is to change the signal T of the hysteresis control amount calculating unit 2308 from a negative value to a positive value. Accordingly, texture control becomes possible in arbitrary concentration areas over a wide latitude range. It will be clear to those skilled in the art that the operations shown in FIG. 22 may be configured of hardware as shown in FIG. 11.

Next, description shall be made regarding the threshold calculating unit 2305 which is a characteristic configuration of the third embodiment. FIG. 23 is a diagram describing the operation of the threshold value calculating unit 2305 according to the third embodiment. Also, FIG. 24 is a diagram describing the binarized results output B*ij according to the third embodiment. Programming language C has been used for description in order to clarify the explanation, but it should be clear that this may be configured of hardware.

The mean density calculation value m, B*ij, input multi-value data D, and the output T of the hysteresis control amount calculating unit 2308 are input to the threshold value calculating unit 2305. Subsequently, as shown in FIG. 23, the value of the signal T is divided by constants LT1 (=2), LT2 (=4), LT3 (=8), and LT4 (=16), internally calculating variables A (=T/LT1), B (=T/LT2), C (=T/LT3), and D (=T/LT4).

Further, the threshold value calculating unit 2305 controls the value of the binarized slice value S using the mean density calculated value m and variables A, B, C, and D obtained above, according to the array state (pattern of the binarized results shown by B*ij from the binarized results delay unit 2303. The arrayed state of the binarized results are as shown by B32–Bi32, B31–Bi31, B30, and B20 in FIG. 24. These all represent past binarized results.

Control of the binarized slice value S according to the array state of the binarized results will be described with reference to FIG. 23.

In the event that the binarized state of the area surrounding the pixel of interest is:

[B32==0 && B22==1 && B12==0 && B21==0 && B11==1 && B01==0] or

[Bi12==0 && Bi22==1 && Bi32==0 && B01==0 && Bi11==1 && Bi21==0], the binarized slice value S is forced to the max constant 255 and thus output. This is to force a state in which dots are not readily printed. Here, "0" in B32==0 indicates a state in which dots have not been printed, and "1" in B22==0 indicates a state in which dots have been printed.

Also, in the event that the binarized state of the area surrounding the pixel of interest is:

[B12==0 && B02==1 && Bi12==0 && Bi22==0 && Bi32==0 && B11==0 && B01==0 && Bi11==1 && Bi21==0 && Bi31==0 && B20==0 && B10==0], and the input multi-value data D is smaller than 31 (meaning the 31 between 0 and 255), the binarized slice value S is forced to the max constant 255 and output in this case, as well. This also is to force a state in which dots are not readily printed.

Further under the above conditions, in the event that the input multi-value data D is equal to or greater than 31 (the 31 between 0 and 255), the binarized slice value S is set to the mean density calculated value m and output. This is to prevent texture control from occurring in the event that the past binarization results form a certain array (pattern).

On the other hand, in the event that the binarized state of the area surrounding the pixel of interest is:

[B02==0 && Bi12==0 && B11==0 && B01==1 && Bi11==1 && Bi21==0 && B20==0 && B10==0], the binarized slice value S is set to a value of the variable A subtracted from the mean density calculated value m (S=m−A). This is to force a state in which dots are readily printed, under the above conditions.

The binarized slice value S is thus controlled by using the mean density calculated value m and the internal variables A, B, C, and D, according to each binarization results pattern. Consequently, in the event that the hysteresis control amount calculating value T is a positive value, dots are controlled toward being more readily printed, and in the event that the hysteresis control amount calculated value T is a negative value, dots are controlled toward being not readily printed.

Thus, a major characteristic is that the amount of control is changed at the threshold calculating unit 2305 according to past binarization array states (patterns).

Sequential execution of such processing to each pixel enables arbitrary texture control according to the value of B*ij output from the binarized results delay unit 2303, and also at an arbitrary area according to the value of the control amount calculated value T.

The third embodiment performs control such that the textures is 2 by 2 pixels. This allows for gathering an arbitrary number of pixels in an area where single pixels are not stable due to printer properties, and forming a stabilized image.

Following such processing being performed at the threshold calculating unit 2305, binarizing processing is performed by the aforementioned binarizing unit 2301.

The binary signal thus output from the binarizing unit 2301 is output from the gradient processing unit 204, and is printed by the printer.

Fourth Embodiment

Next, the fourth embodiment shall be described in detail. The overall configuration of the photocopier in the fourth embodiment is the same as that of the first embodiment (FIGS. 1–2). Also, while description shall be made regarding the gradient conversion processing unit (204), the portions thereof which are the same as those in the third embodiment shall be denoted by the same reference numerals, and description thereof shall be omitted.

Now, with regard to the configuration of the third embodiment, in the event that the video clock of the image signals D being sent reaches high speeds, the timing for obtaining binary slice value S is critical. This is because the slice value control unit 2305 must obtain the binarized slice value S following the results of the mean density calculating unit 2304 being output, despite the fact that processing should be proceeding at the same speed as the video clock between the mean density calculating unit 2304 and the binarizing unit 2301. In other words, insertion of a heavy load of processing with the threshold value control unit 2305 between the mean density calculating unit 2304 and the binarizing unit 2301 prevents faster speeds.

Accordingly, in the fourth embodiment, the calculating unit calculating the binarized threshold value S for the third embodiment has been changed, so as to allow dealing with high-speed video clocks, as well. The following is a description of the gradient conversion processing unit 204 according to the fourth embodiment.

Figure 25:
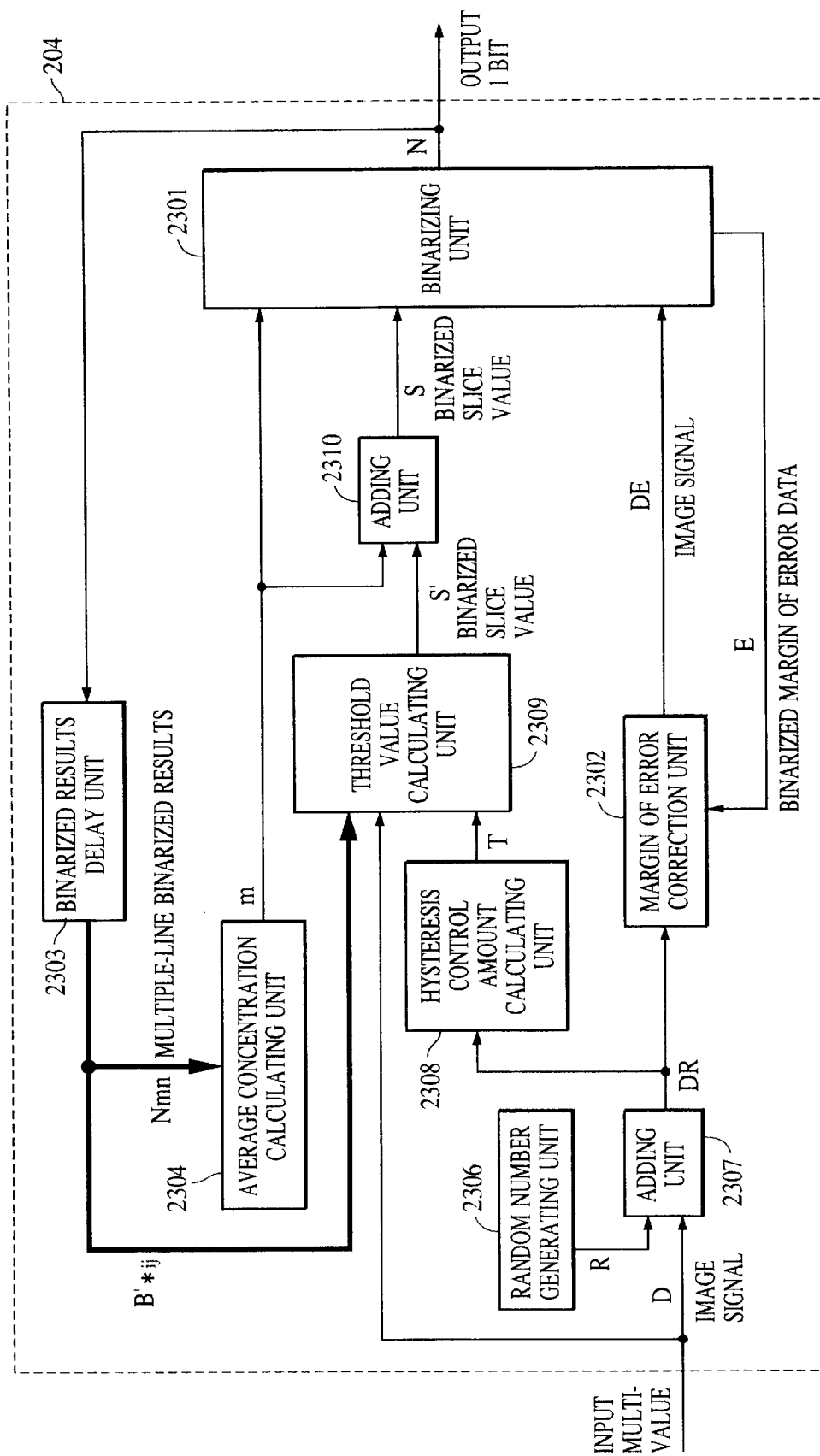
FIG. 25 is a block diagram illustrating the configuration of the gradient conversion processing unit according to a fourth embodiment.

FIG. 25 is a block diagram illustrating the configuration of the gradient conversion processing unit according to the fourth embodiment. In FIG. 25, the major difference with the third embodiment (FIG. 18) are that the mean density calculated value m toward the mean density calculating unit 2304 which had been input to the threshold calculating unit 2305 is not input to the threshold calculating unit 2309 as in the fourth embodiment.

Input to the threshold calculating unit 2309 are: output B'*ij of the binarized results delay unit 2303 with the exception of B10 which is the binarized results immediately preceding the pixel of interest, output T of the hysteresis control amount calculating unit 2308, and multi-value signal D. Thus, the binarized slice value S' can be obtained before the mean density calculated value m is calculated by the mean density calculating unit 2304.

FIG. 26 is a diagram describing the operation of the threshold value calculating unit according to the fourth embodiment. Here, programming language C has been used for description in order to clarify the explanation, but it is clear that functions such as shown in FIG. 26 may be realized by hardware.

First, the value of the signal T of the hysteresis control amount calculating unit 2308 input to the threshold calculating unit 2309 is divided by constants LT1 (=2), LT2 (=4), LT3 (=8), and LT4 (=16), and variables A (=T/LT1), B (=T/LT2), C (=T/LT3), and D (=T/LT4) are internally calculated, as with the third embodiment.

Next, the threshold calculating unit 2309 controls the value of the binarized slice value S' by using the internal variables A, B, C, and D, according to the binarized results array state (pattern) of B'*ij output from the binarized results delay unit 2303. That is, unlike the third embodiment, there is no need for output m of the mean density calculating unit 2304. Also, the binarized results array state (pattern) used by the threshold calculating unit 2309 is as shown in FIG. 27. All of these represent past binarization results, and the pixel immediately prior to the pixel of interest is not referred to.

Thus, by means of not making reference to the pixel immediately prior to the pixel of interest, higher speeds can be dealt with. That is, in the case of inputting to the threshold calculating unit something which includes reference to the pixel immediately prior to the pixel of interest, a substantial amount of time is required till the calculation results are obtained. In other words, threshold calculation must be performed after waiting for the results of the pixel immediately prior to the pixel of interest. In such a case, very fast calculating speed are needed in order to keep up with the timing of the output signals from the mean density calculating unit. This calls for performing several heavy calculations within a single clock timing, and is not practical. Accordingly, timing with the mean density calculating unit is facilitated by means of not referring to the pixel immediately prior to the pixel of interest at the threshold calculating unit, but rather starting threshold calculation beforehand, thereby dealing with high speeds.

The following is a description of actual controlling of the binarized slice value S' according to the binarized results array state (pattern), with reference to FIG. 26.

In the event that the binarized state of the area surrounding the pixel of interest is:

[B32==0 && B22==1 && B12==0 && B21==0 && B11==1 && B01==0] or

[Bi12==0 && Bi22==1 && Bi32==0 && B01==0 && B11==1 && Bi21==0], the binarized slice value S is forced to the max constant 255 and thus output. This is to force a state in which dots are not readily printed, as with the first embodiment under the above conditions.

Also, in the event that the binarized state of the area surrounding the pixel of interest is:

[B12==0 && B02==0 && Bi12==0 && Bi22==0 && Bi32==0 && B11==0 && B01==0 && Bi11==1 && Bi21==0 && Bi31==0 && B20==0], and the input multi-value data D is smaller than 31 (the 31 between 0 and 255), the binarized slice value S is forced to the max constant 255 and output in this case, as well. This also is to force a state in which dots are not readily printed.

However, in this case, unlike the third embodiment, the results of the pixel immediately prior to the pixel of interest are not referred to.

On the other hand, under the above conditions, in the event that the input multi-value data D is equal to or greater than 31 (the 31 between 0 and 255), the binarized slice value S' is set to the mean density calculated value m and output. This is to prevent texture control from occurring in the event that the past binarization results form a certain array (pattern). Needless to say, the constant −31 here is not a fixed value; rather, it is a parameter, and may be set to 48 or 64 or other values.

At this time, it goes without saying that increasing the value of 31 results in a tendency toward aggressive texture control, while reducing the value makes it more difficult for texture control to be applied.

On the other hand, in the event that the binarized state of the area surrounding the pixel of interest is:

[B02==0 && Bi12==0 && B11==0 && B01==1 && Bi11==1 && Bi21==0 && B20==0], the binarized slice value S is set to a value of the negative of variable A (S=−A). This is to force a state in which dots are readily printed, under the above conditions. In this case as well, the results of the pixel immediately prior to the pixel of interest are not referred to.

In the same manner, the binarized slice value S' is thus controlled by using the internal variables A, B, C, and D and constants with regard to the binarized slice value S, according to each binarization results pattern.

Consequently, in the event that the hysteresis control amount calculating value T is a positive value, dots are controlled toward being more readily printed, and in the event that the hysteresis control amount calculated value T is a negative value, dots are controlled toward being not readily printed.

Sequential execution of such processing to each pixel enables arbitrary texture control according to the value of B'*ij output from the binarized results delay unit 2303, and also at an arbitrary area according to the value of the control amount calculated value T.

The fourth embodiment performs control such that the textures is 2 by 2 pixels. This allows for gathering an arbitrary number of pixels in an area where single pixels are not stable due to printer properties, and forming a stabilized image. That is to say, even in the event that the pixel immediately prior to the pixel of interest is not referred to for the sake of increasing speed, effects the same as those of the third embodiment can be obtained.

Next, the binarized slice value S' obtained thus is input to the adding unit 2310 with the output m of the mean density calculating unit 2304, and adding is conducted. At this time, in the event that the signal of the binarized slice value S' is 255, the binarized slice value S us output as 255, and otherwise, calculation of S=S'+m is performed and output. This is shown in FIG. 28. Following the binarized slice value S being obtained from the binarized slice value S' by means of an adding unit 2310, binarizing processing is performed by the binarizing unit 2301 as with the third embodiment. The binary signal is output from the gradient processing unit 204, and is printed by the printer unit 105.

As described above, according to the above embodiments, the amount of dot concentration can be controlled for a printer which cannot accurately reproduce single dots, thereby yielding stable image forming. Also, texture control can be made according to the printer properties, by means of allowing ALF, ALFm, and LR1 through 4 to be settable.

Also, the image can be improved by concentrated control of dots in areas where the dots have a tendency to scatter and cause pseudo outlines and irregularities.

Further, there has been a problem regarding facsimile communication in that the rate of compression cannot be raised for error diffused images, but the compressing ratio can be raised with concentrated dot control according to the present method, since the ratio of connected white dots and black dots is raised.

Particularly, according to the third and fourth embodiments, the amount of dot concentration can be controlled in a stable manner for a printer which cannot accurately reproduce single dots, allowing texture control to be made according to the printer properties. Consequently, highly precise images can be formed.

Further, according to the process of the present invention in which past n-value-izing results are referred to, the texture is not restricted to 2×2 dot concentration type; rather, accurate control can be made for 2×1 or 1×2 dot concentration types, as well. Also, accurate dot concentration control can be carried out in arbitrary forms, such as 3×3 or 2×3, by widening the area of past n-value-izing results to be referred to.

Also, in the above embodiments, the random number to be added to the image signal D is a random number such that does not affect the image quality. The random numbers improve the texture which has unique worm-track-like marks. In practice, random numbers which have equal absolute values every other pixel only with the "+" or "−" symbols reversed. For example, random number "−R1, 0, +R1, 0, −R2, 0, +R2, 0 . . . " are added. Here, R1, R2, and so forth represent random numbers including the "+" or "−" symbols. Thus, the low-frequency component of the random numbers is reduced by cyclically adding random numbers which have equal absolute values every other pixel with the "+" or "−" symbols reversed, thereby reducing coarseness apparent to the human eye. In other words, the texture can be improved without image deterioration owing to random numbers.

Other Embodiments

Although the above embodiments have been described with binarizing, other general multi-value systems such as quad, octal, hexadecimal, and so forth may be applied. Further, it is needless to say that the above embodiments are by no means restricted to the error diffusion method (ED method); rather, a general mean density method (MD method) may be applied as well.

Also, it is needless to say that the present invention is by no means restricted to black/white (monochrome) processing; rather, processing can be applied to color signals as well, by changing the amount of dot concentration per color signal. This is advantageous in that the differences in the process conditions of each color can be absorbed. For example, in the event that only black single dots cannot be reproduced with a certain printer in a stable manner, dot concentration for the black color alone can be conducted by texture control thereof.

Further, although the slice value control unit used image signals DR formed by adding the mean density calculated value m and random numbers, the arrangement may be such that the amount of change in slice value is controllable simply by input image signals.

Also, the arrangement may be such that the slice control unit (305, 1103) is omitted, and the signals of the mean density calculating unit 304 (first embodiment) or the adding unit 1102 (second embodiment) input to the adding unit 306. However, in this case, texture control effects are obtained for all concentration areas, not only an arbitrary concentration area. Now, though texture control is applied to all concentration areas, still, dots are not simply output in units of two pixels as with known arrangements, so the image quality will not be such that gives an impression of deteriorated resolution.

On the other hand, texture control can be conducted without depending on the mean density calculated value m or input image signal DR, by controlling the amount of change of the binary slice value with a constant value. The arrangement may be such that this constant value can be set by the operating unit 111. Setting this constant value from the operating unit 111 means that the slice value changing amount II at the adding unit 306 is FIG. 14 can be directly set. Consequently, the size of the signal S output from the adding unit 306 can be arbitrarily controlled, so that the amount of concentration of the texture can be controlled. In other words, the degree of concentration of dots can be set at the operating unit.

Further, according to the third and fourth embodiments, binarized results two lines back are referred to for creating a 2×2 dot concentration type texture, but the present invention is by no means restricted to such; rather, 2×1 dot concentration type texture can be made, or further, reference can be made to binarized results three lines back to create 3×3 dot concentration type texture or 3×2 dot concentration type texture.

Also, through the above embodiments have described the gradient processing unit 204 (FIG. 1) as being mainly hardware, but in the event that the processing speed can keep up, part or all of the processing described with reference to the gradient processing unit 204 may be realized with software. In this case, the control program is stored in the ROM 107, and is executed by the CPU 106.

Also, the arrangement may be such that the constants ALF, ALFm, LR1–LR4, and LT1–LT4 which are used in the above embodiments can be set to desired values from the operating unit 111.

The present invention may also be applied to a system configured of a plurality of devices (e.g., host computer, interface device, reader, printer, etc.) or an apparatus comprising a single device (e.g., photocopier, facsimile apparatus, etc.).

Also, the objects of the present invention can be achieved by means of providing the system or apparatus with a storage device on which software program code for realizing the functions of the above embodiments, so that the computer (or CPU or MPU) of the system or apparatus reads and executes to program code stored within the storage medium.

In this case, the program codes themselves, which were read out from the memory medium, will realize the functions of the previously mentioned embodiments, and the storage medium which recorded those program codes comprises the present invention.

The storage medium to provide the program codes may be, for example, a floppy disk, a hard disk, an optical disk, a magnetic optical disk, a CD-ROM, a CD-R, magnetic tape, a non-volatile memory card, ROM, etc.

Also, by executing the program codes which were read out by the computer, not only will the previously mentioned embodiment's functions be realized, but it goes without saying that, based on the instructions of the program codes, the OS (operating system) and so forth operating on the computer, can execute the process partially, or in full, and realization of the functions of the previously mentioned embodiments by such a process is encompassed by the present invention.

Moreover, the software program code which is read out from the storage medium may be written in the memory of an expansion card or an expansion unit connected with the computer, and in such cases, the CPU of the expansion card or the expansion unit may execute the above described steps in part or in full, based on the instructions of the program code, and realization of the functions of the previously mentioned embodiments by such a process is encompassed by the present invention.

According to the present invention as described above, dot concentration can be controlled based on the state of n-value-izing of multi-value image data, thereby preventing deterioration of output resolution which occurs with dot concentration.

Also, according to the present invention, the amount of dot concentration can be controlled according to printer properties.

Also, according to the present invention, the amount of dot concentration can be controlled at certain concentration ranges at which pseudo outlines or irregularities in concentration, for example, tend to occur.

Further, according to the present invention, accurate control of texture can be made by controlling the threshold value of the n-value-izing process according to the array pattern resulting from previous n-value-izing cases.

As many apparently widely differing embodiments of the present invention can be made without departing from the spirit and scope thereof, it is to be understood that the invention is not limited to the specific embodiments thereof except as defined in the appended claims.

What is claimed is:

1. An image processing device, comprising:

input means for inputting multi-value image data;

converting means for converting the multi-value image data input by said input means into n-value data;

control means for controlling an amount of concentration of dots represented by the n-value data obtained by said converting means, the amount of concentration indicating continuity of the dots; and judging means for judging a density of said input image;

wherein said control means controls the amount of concentration of dots by means of controlling a threshold value used for the conversion to n-value data in said converting means, according to the density of the input image judged by said judging means, and wherein the control means can arbitrarily set each density area in which the continuity of dots is to be controlled.

2. An image processing device according to claim 1, wherein said judging means judges the density of the input image based on the n-value data obtained by said converting means.

3. An image processing device according to claim 1, wherein said judging means judges the density of the input image based on the multi-value data input by said input means.

4. An image processing device according to claim 1, wherein said judging means judges the density of the input image based on the multi-value image data and random number data input by said input means.

5. An image processing device according to claim 1, further comprising means for correcting error data which occurs upon converting multi-value image data into n-value data by said converting means.

6. An image processing device, comprising:

input means for inputting multi-value image data;

converting means for converting the multi-value image data input by said input means into n-value data;

control means for controlling an amount of concentration of dots represented by the n-value data obtained by said converting means, the amount of concentration indicating continuity of the dots; and storing means for storing the n-value data of a plurality of pixels obtained by said converting means;

wherein said control means controls the amount of concentration of dots by means of controlling a threshold value used for the conversion to n-value data in said converting means, based on the n-value data of the plurality of pixels stored in said storing means, and wherein the control means can arbitrarily set each density area in which the continuity of dots is to be controlled.

7. An image processing device according to claim 6, further comprising means for correcting error data which occurs upon converting multi-value image data into n-value data by said converting means.

8. An image processing method, comprising the steps of:

an input step for inputting multi-value image data;

a converting step for converting the multi-value image data input in said input step into n-value data;

a control step for controlling an amount of concentration of dots represented by the n-value data obtained in said converting step, the amount of concentration indicating continuity of the dots; and a judging step for judging a density of said input image;

wherein the amount of concentration of dots is controlled in said control step by controlling a threshold value used for the conversion to n-value data in said converting step, according to the density of the input image judged in said judging step, and wherein the control step can arbitrarily set each density area in which the continuity of dots is to be controlled.

9. An image processing method according to claim 8, wherein the density of the input image is judged in said judging step based on the n-value data obtained in said converting step.

10. An image processing method according to claim 8, wherein the density of the input image is judged in said judging step based on the multi-value data input in said input step.

11. An image processing method according to claim 8, wherein the density of the input image is judged in said judging step based on the multi-value image data and random number data input in said input step.

12. An image processing method according to claim 8, further comprising a step for correcting error data which occurs upon converting multi-value image data into n-value data in said converting step.

13. An image processing method, comprising the steps of:

an input step for inputting multi-value image data;

a converting step for converting the multi-value image data input in said input step into n-value data;

a control step for controlling an amount of concentration of dots represented by the n-value data obtained in said converting step, the amount of concentration indicating continuity of the dots; and a storing step for storing the n-value data of a plurality of pixels obtained in said converting step;

wherein the amount of concentration of dots is controlled in said control step by controlling a threshold value used for the conversion to n-value data in said converting step, based on the n-value data of the plurality of pixels stored in said storing step, and wherein the control step can arbitrarily set each density area in which the continuity of dots is to be controlled.

14. An image processing method according to claim 13, further comprising a step for correcting error data which occurs upon converting multi-value image data into n-value data in said converting step.

15. An image processing device, comprising:

n-value-izing means for n-value-izing a value of input multi-value data;

holding means for holding n-value-ized data in a predetermined order near a pixel of interest obtained by said n-value-izing means;

multi-value-izing means for generating multi-value data based on the n-value-ized data held in said holding means; and control means for controlling an amount of concentration of dots represented by said n-value-ized data by controlling a threshold level of the n-value-izing processing regarding a pixel of interest in said n-value-izing means based on the multi-value data obtained by said multi-value-izing means, wherein, the amount of concentration of the dots indicates continuity of the dots, and wherein the control means can arbitrarily set each density area in which the continuity of dots is to be controlled.

16. An image processing device according to claim 15, wherein multi-value-izing of the n-value-ized data is conducted by multiplying the n-value-ized data held in said holding means by a coefficient determined according to a relative position as to said pixel of interest.

17. An image processing device according to claim 16, wherein the coefficient in said multi-value-izing means is set such that the closer the relative position to the pixel of interest, the greater the coefficient.

18. An image processing device according to claim 15, further comprising setting means for setting constant data to be used by said control means, wherein said control means controls the threshold value level of the n-value-izing processing regarding the pixel of interest in said n-value-izing means, based on the value obtained by said multi-value-izing means and constant data set by said setting means.

19. An image processing device according to claim 15, further comprising correction value generating means for generating a correction value for controlling the threshold value in said control means, based on concentration information obtained from said multi-value image data, wherein said control means controls the threshold value level of the n-value-izing processing regarding the pixel of interest in said n-value-izing means, based on the value obtained by said multi-value-izing means and the correction value generated by said correction value generating means.

20. An image processing device according to claim 19, wherein the concentration information in said correction value generating means consists of a value obtained by said multi-value-izing means.

21. An image processing device according to claim 20, wherein said correction value generating means generates said correction value with a function which takes the value obtained by said multi-value-izing means as a variable.

22. An image processing device according to claim 19, further comprising adding means for adding random numbers to each pixel data of said input multi-value image data;

wherein the concentration information in said correction value generating means consists of a value obtained by said adding means.

23. An image processing device according to claim 22, wherein said correction value generating means generates said correction value with a function which takes the value obtained by said adding means as a variable.

24. An image processing device according to claim 15, further comprising adding means for adding random numbers to each pixel data of said input multi-value image data;

wherein said control means controls the threshold level of the n-value-izing processing regarding the pixel of interest in said n-value-izing means, based on the value obtained by said multi-value-izing means and a value obtained by said adding means.

25. An image processing device according to claim 19, wherein the concentration information in said correction value generating means is a value corresponding with the pixel of interest of said multi-value image data.

26. An image processing device according to claim 25, wherein said correction value generating means generates said correction value with a function which takes a value corresponding with said pixel of interest of said multi-value image data as a variable.

27. An image processing device, comprising:
n-value-izing means for n-value-izing a value of input multi-value data;
holding means for holding n-value-ized data in a predetermined order near a pixel of interest obtained by said n-value-izing means; and
control means for controlling an amount of concentration of dots represented by said n-value-ized data by controlling a threshold value level of the n-value-izing processing regarding the pixel of interest, based on an array state of the n-value data in the n-value-ized data held in said holding means, based on the multi-value data obtained by said multi-value-izing means, wherein, the amount of concentration of the dots indicates continuity of the dots, and wherein the control means can arbitrarily set each density area in which the continuity of dots is to be controlled.

28. An image processing device according to claim 27, further comprising n-value-izing means for generating n-value data based on the n-value-ized data held in said holding means;
wherein said control means controls the threshold value level of the n-value-izing processing regarding the pixel of interest in said n-value-izing means, based on the array state of the n-value data in the n-value-ized data held in said holding means and the value obtained by said multi-value-izing means.

29. An image processing device according to claim 22, further comprising correction value generating means for generating a correction value for controlling the threshold value in said control means, based on concentration information obtained from said multi-value image data,
wherein said control means controls the threshold value level of the n-value-izing processing regarding the pixel of interest in said n-value-izing means, based on the array state of the n-value data in the n-value-ized data held in said holding means, and the value obtained by said multi-value-izing means and the corrected value generated by said correction value generating means.

30. An image processing device according to claim 29, further comprising adding means for adding random numbers to each pixel data of said input multi-value image data;
wherein the concentration information in said correction value generating means consists of a value obtained by said adding means.

31. An image processing device according to claim 29, said control means comprising:
first control means for generating a tentative threshold value based on the corrected value obtained by said correction value generating means and the array state of the n-value data in the n-value-ized data held in said holding means; and
second control means for updating the tentative threshold value based on the value obtained by said multi-value-izing means, into the threshold to be used by said n-value-izing means.

32. An image processing method, comprising the steps of:
an n-value-izing step for n-value-izing the value of input multi-value data;
a holding step for holding in memory the n-value-ized data in a predetermined order near a pixel of interest obtained in said n-value-izing step;
a multi-value-izing step for generating multi-value data based on the n-value-ized data held in memory; and
a control step for controlling an amount of concentration of dots represented by said n-value-ized data by controlling a threshold value level of the n-value-izing processing regarding the pixel of interest in said n-value-izing step, based on the multi-value data obtained in said multi-value-izing step, wherein, the amount of concentration of the dots indicates continuity of the dots, and wherein the control step can arbitrarily set each density area in which the continuity of dots is to be controlled.

33. An image processing method according to claim 32, further comprising a setting step for setting constant data to be used in said control step,
wherein the threshold value level of the n-value-izing processing regarding the pixel of interest in said n-value-izing step is controlled in said control step, based on a value obtained in said multi-value-izing step and the constant data set in said setting step.

34. An image processing method according to claim 32, further comprising a correction value generating step for generating a correction value for controlling the threshold value in said control step, based on concentration information obtained from said multi-value image data;
wherein the threshold value level of the n-value-izing processing regarding the pixel of interest in said n-value-izing step is controlled in said control step, based on a value obtained in said multi-value-izing step and the correction value generated in said correction value generating step.

35. An image processing method, comprising the steps of:
an n-value-izing step for n-value-izing a value of input multi-value data;
a holding step for holding in memory the n-value-ized data in a predetermined order near a pixel of interest obtained in said n-value-izing step; and
a control step for controlling an amount of concentration of dots represented by said n-value-ized data by controlling a threshold value level of the n-value-izing processing regarding the pixel of interest based on an array state of the n-value data in the n-value-ized data held in said memory, based on the multi-value data obtained in said multi-value-izing step, wherein, the amount of concentration of dots indicates continuity of the dots, and wherein the control step can arbitrarily set each density area in which the continuity of dots is to be controlled.

36. An image processing method according to claim 35, further comprising a correction value generating step for generating a correction value for controlling the threshold value in said control step, based on concentration information obtained from said multi-value image data;
wherein the threshold value level of the n-value-izing processing regarding the pixel of interest in said n-value-izing step is controlled in said control step, based on the array state of the n-value data in the n-value-ized data held in said holding step, and a value obtained in said multi-value-izing step and the corrected value generated in said correction value generating step.

37. Computer-readable memory storing a control program for controlling image processing, said control program comprising:

code for an n-value-izing step for n-value-izing a value of input multi-value data;

code for a holding step for holding in memory the n-value-ized data in a predetermined order near a pixel of interest obtained in said n-value-izing step;

code for a multi-value-izing step for generating multi-value data based on the n-value-ized data held in said memory; and code for a control step for controlling an amount of concentration of dots represented by said n-value-ized data by controlling a threshold value level of the n-value-izing processing regarding the pixel of interest in said n-value-izing step, based on a value obtained in said multi-value-izing step, wherein, the amount of concentration of the dots indicates continuity of the dots, and wherein the control step can arbitrarily set each density area in which the continuity of dots is to be controlled.

38. Computer-readable memory storing a control program for controlling image processing, said control program comprising:

code for an n-value-izing step for n-value-izing a value of input multi-value data;

code for a holding step for holding in memory the n-value-ized data near a pixel of interest obtained in said n-value-izing step; and code for a control step for controlling an amount of concentration of dots represented by said n-value-ized data by controlling a threshold value level of the n-value-izing processing regarding the pixel of interest, based on an array state of the n-value data in the n-value-ized data held in said holding step, wherein, the amount of concentration of the dots indicates continuity of the dots, and wherein the control step can arbitrarily set each density area in which the continuity of dots is to be controlled.

* * * * *

UNITED STATES PATENT AND TRADEMARK OFFICE
CERTIFICATE OF CORRECTION

PATENT NO. : 6,668,100 B1
DATED : December 23, 2003
INVENTOR(S) : Kaburagi et al.

It is certified that error appears in the above-identified patent and that said Letters Patent is hereby corrected as shown below:

Title page,
Item [57], ABSTRACT,
Line 1, "convert" should read -- converting --.

Column 2,
Lines 10 and 15, begin new paragraph after "and"; and
Line 21, "aspect" should read -- aspect of --.

Column 3,
Line 55, "with" should read -- to --; and
Line 66, "representing of" and should read -- representing --.

Column 7,
Line 47, "32)" should read -- 32). --.

Column 8,
Line 42, "terminal" should read -- terminal. --.

Column 10,
Line 6, "*2+p[21])" should read -- *2+p[21]). --; and
Line 8, "through" should read -- though --.

Column 12,
Line 11, "he mean" should read -- the mean --; and
Line 64, "N=0" should read -- N=0. --.

Column 13,
Line 1, "E=$m$-DE" should read -- E=$m$-DE. --.

Column 14,
Line 7, "binarized, this" should read -- binarized. This --;
Line 11, "ins" should read -- is --;
Line 18, "configures" should read -- configured --;
Line 33, "(0≤ii≤25)," should read -- (0≤ii≤25). --;
Line 34, "p[24]" should be in bold numerals;
Line 38, "*17/128)" should read -- *17)/128). --; and
Line 40, "through" should read -- though --.

UNITED STATES PATENT AND TRADEMARK OFFICE
CERTIFICATE OF CORRECTION

PATENT NO. : 6,668,100 B1
DATED : December 23, 2003
INVENTOR(S) : Kaburagi et al.

It is certified that error appears in the above-identified patent and that said Letters Patent is hereby corrected as shown below:

Column 15,
Line 21, "(LR2-LR1)))/256" should read -- (LR2-LR1)))/256. --; and
Line 37, "(LR4-LR3)))/256" should read -- (LR4-LR3)))/256. --.

Column 16,
Line 7, "(pattern" should read -- pattern --.

Column 17,
Line 8, "2301." should read -- 2301.  The --; and
Line 9, "(paragraph) The" should read -- The --.

Column 18,
Line 22, "speed" should read -- speeds --.

Column 19,
Line 39, "us output" should read -- is output --.

Column 21,
Line 15, "through" should read -- though --; and
Line 17, "but" should be deleted.

Signed and Sealed this

Ninth Day of November, 2004

JON W. DUDAS
*Director of the United States Patent and Trademark Office*